US011119009B2

(12) United States Patent
Sato

(10) Patent No.: US 11,119,009 B2
(45) Date of Patent: Sep. 14, 2021

(54) ABNORMALITY SIGN NOTIFYING SYSTEM, METHOD, AND PROGRAM

(71) Applicant: TOYOTA JIDOSHA KABUSHIKI KAISHA, Toyota (JP)

(72) Inventor: Shun Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 353 days.

(21) Appl. No.: 16/149,788

(22) Filed: Oct. 2, 2018

(65) Prior Publication Data

US 2019/0162631 A1 May 30, 2019

(30) Foreign Application Priority Data

Nov. 24, 2017 (JP) .............................. JP2017-226226

(51) Int. Cl.
*G06F 11/30* (2006.01)
*G01M 99/00* (2011.01)
(52) U.S. Cl.
CPC .................................. *G01M 99/005* (2013.01)
(58) Field of Classification Search
None
See application file for complete search history.

(56) References Cited

FOREIGN PATENT DOCUMENTS

| CN | 105171748 A | 12/2015 |
|---|---|---|
| CN | 106219342 A | 12/2016 |
| JP | 2011-253393 | 12/2011 |
| JP | 2011253393 | * 12/2011 |
| JP | 2015-88045 | 5/2015 |
| JP | 2015-118416 A | 6/2015 |
| JP | 2017-040976 A | 2/2017 |

\* cited by examiner

*Primary Examiner* — Phuong Huynh
(74) *Attorney, Agent, or Firm* — Oblon, McClelland, Maier & Neustadt, L.L.P.

(57) ABSTRACT

An abnormality sign notifying system includes: an abnormality occurrence time estimation unit configured to estimate an abnormality occurrence time at which an abnormality occurs in a facility based on information related to an operation of the facility installed in a production line; an abnormality elimination period estimation unit configured to estimate an abnormality elimination period required for eliminating the abnormality of the facility based on characteristic information related to a part, which is a replacement required part, necessary for eliminating the abnormality of the facility; a notifying time setting unit configured to set a notifying time at which a sign of the abnormality of the facility is notified at the abnormality elimination period before the abnormality occurrence time; and a notifying unit configured to notify the sign of the abnormality of the facility at the notifying time.

12 Claims, 20 Drawing Sheets

| 1 | ABNORMALITY DATA A | ABNORMALITY MODE A | OPERATION STATE DATA #4 | 0.98 |
|---|---|---|---|---|
| 2 | ABNORMALITY DATA A | ABNORMALITY MODE A | OPERATION STATE DATA #2 | 0.88 |
| 3 | ABNORMALITY DATA B | ABNORMALITY MODE B | OPERATION STATE DATA #2 | 0.74 |
| 4 | ABNORMALITY DATA C | ABNORMALITY MODE C | OPERATION STATE DATA #3 | 0.72 |
| ⋮ | ⋮ | ⋮ | ⋮ | ⋮ |

Fig. 7

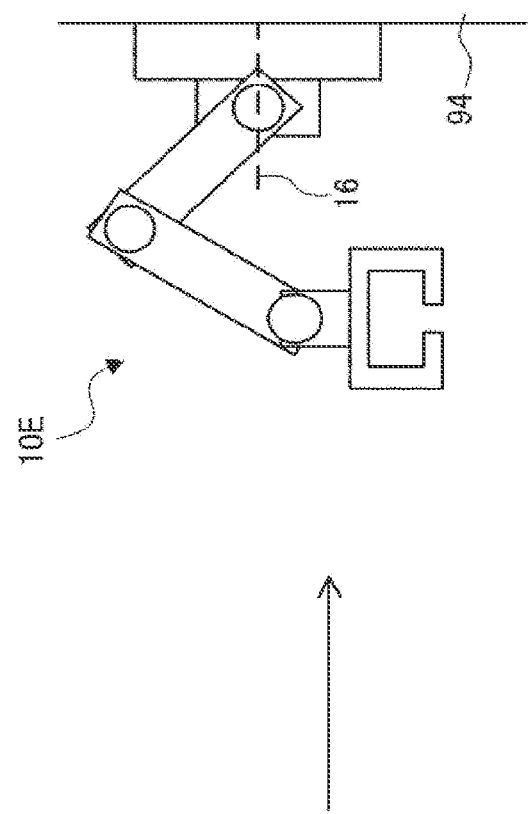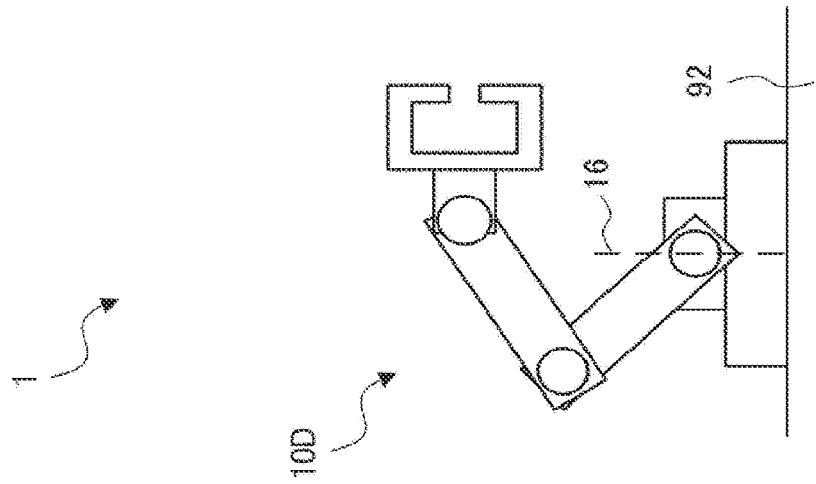
Fig. 13

| | | | |
|---|---|---|---|
| ENVIRONMENT | SPEED REDUCER TEMPERATURE | NO CHARACTERISTIC CHANGE LESS THAN 60°C →LOW ABNORMALITY PROGRESS LEVEL | THRESHOLD:LARGE →SLOW NOTIFY |
| | | CHARACTERISTIC CHANGE AT 60°C OR HIGHER →HIGH ABNORMALITY PROGRESS LEVEL | THRESHOLD: SMALL →QUICK NOTIFY |
| USAGE MODE | WELDING PROCESS | SMALL NUMBER OF BRAKE OPERATIONS →LOW PROGRESS LEVEL OF BRAKE WEARING-OUT | THRESHOLD: LARGE →SLOW NOTIFY |
| | COATING PROCESS | LARGE NUMBER OF BRAKE OPERATIONS →HIGH PROGRESS LEVEL OF BRAKE WEARING-OUT | THRESHOLD: SMALL →QUICK NOTIFY |
| USAGE MODE | TOP COATING PROCESS | SMALL NUMBER OF RECIPROCATING OPERATIONS →LOW PROGRESS LEVEL OF SPEED REDUCER BEARING WEARING-OUT | THRESHOLD: LARGE →SLOW NOTIFY |
| | INTERMEDIATE COATING PROCESS | LARGE NUMBER OF RECIPROCATING OPERATIONS →HIGH PROGRESS LEVEL OF SPEED REDUCER BEARING WEARING-OUT | THRESHOLD: SMALL →QUICK NOTIFY |
| USAGE MODE | FLOOR MOUNTED | SMALL LOAD ON PIVOT SHAFT →LOW ABNORMALITY PROGRESS LEVEL OF SPEED REDUCER OF PIVOT SHAFT | THRESHOLD: LARGE →SLOW NOTIFY |
| | WALL HANGING | LARGE LOAD ON PIVOT SHAFT →HIGH ABNORMALITY PROGRESS LEVEL OF SPEED REDUCER OF PIVOT SHAFT | THRESHOLD: SMALL →QUICK NOTIFY |

Fig. 14

| FACILITY | ABNORMALITY MODE | PART NUMBER | STOCK | HEAVY LOAD | NUMBER OF PROCUREMENT DAYS | NUMBER OF WORKING DAYS |
|---|---|---|---|---|---|---|
| ROBOT | A | 3160 | NO | NO | 14 | 0 |
| ROBOT | B | 137 | YES | NO | 9 | 0 |
| ROBOT | C | 2150 | YES | NO | 5 | 0 |
| VEHICLE BODY TRANSPORTER | A | 1014 | YES | YES | 30 | 25 |
| VEHICLE BODY TRANSPORTER | B | 8694 | NO | YES | 16 | 35 |

Fig. 17

ABNORMALITY SIGN NOTIFYING SYSTEM, METHOD, AND PROGRAM

CROSS REFERENCE TO RELATED APPLICATIONS

This application is based upon and claims the benefit of priority from Japanese patent application No. 2017-226226, filed on Nov. 24, 2017, the disclosure of which is incorporated herein in its entirety by reference.

BACKGROUND

The present disclosure relates to an abnormality sign notifying system, a method, and a program.

Patent Literature 1 (Japanese Unexamined Patent Application Publication No. 2011-253393) discloses a technique of estimating a lifetime of a part, and when the lifetime of the part is before an inspection time of a regular periodic schedule and within a period after a scheduled early inspection time, changing the regular periodic inspection schedule in such a way that the part is inspected in this period.

SUMMARY

In the configuration of Patent Literature 1, the inspection is scheduled in consideration of only the lifetime of the part. Thus, flexibility of the scheduling is poor.

An object of the present disclosure is to provide a technique of more finely setting the timing to notify a sign of an abnormality of a facility.

The present disclosure provides an abnormality sign notifying system that includes: an abnormality occurrence time estimation unit configured to estimate an abnormality occurrence time at which an abnormality occurs in a facility based on information related to an operation of the facility installed in a production line; an abnormality elimination period estimation unit configured to estimate an abnormality elimination period required for eliminating the abnormality of the facility based on characteristic information related to a part necessary for eliminating the abnormality of the facility; a notifying time setting unit configured to set a notifying time at which a sign of the abnormality of the facility is notified at the abnormality elimination period before the abnormality occurrence time; and a notifying unit configured to notify the sign of the abnormality of the facility at the notifying time. The above configuration achieves the notifying time that is flexibly set by taking the characteristic information into account.

Preferably, when the abnormality elimination period is less than a predetermined number of days, the abnormality elimination period estimation unit estimates the abnormality elimination period in such a way that the abnormality elimination period becomes the predetermined number of days. The above configuration enables the abnormality of the facility to be eliminated with enough time in schedule even when the abnormality elimination period is extremely short.

Preferably, the characteristic information includes information related to whether the part is in stock, and the abnormality elimination period estimation unit estimates the abnormality elimination period in such a way that the abnormality elimination period becomes longer when the part is out of stock than the abnormality elimination period when the part is in stock. The above configuration makes it easy to ensure a period required for procuring the part, thereby reliably eliminating the abnormality of the facility before the abnormality occurrence time.

Preferably, the abnormality elimination period estimation unit estimates the abnormality elimination period in such a way that the abnormality elimination period becomes longer when the part is out of stock than the abnormality elimination period when the part is in stock at least for a period necessary to procure the part. According to the above configuration, the period required for procuring the part can be ensured, and thus the above configuration can more reliably eliminate the abnormality of the facility before the abnormality occurrence time.

Preferably, the characteristic information includes information related to a weight of the part, and the abnormality elimination period estimation unit estimates the abnormality elimination period in such a way that the abnormality elimination period becomes longer when the weight is a predetermined weight or heavier than the abnormality elimination period when the weight is less than the predetermined weight. The above configuration makes it easy to ensure a period required for carrying out and carrying in the part, thereby reliably eliminating the abnormality of the facility before the abnormality occurrence time.

Preferably, the abnormality elimination period estimation unit estimates the abnormality elimination period in such a way that the abnormality elimination period becomes longer when the weight is the predetermined weight or heavier than the abnormality elimination period when the weight is less than the predetermined weight at least for a period required for carrying the part out from the production line and carrying the part into the production line. The above configuration makes it possible to ensure a period required for carrying out and carrying in the part, thereby reliably eliminating the abnormality of the facility before the abnormality occurrence time.

Preferably, when the weight of the part is the predetermined weight or heavier, and there is a long suspension period during which an operation of the production line stops continuously at least for three days or longer before the abnormality occurrence time, the notifying time setting unit sets the notifying time in such a way that the notifying time is at the abnormality elimination period before the abnormality occurrence time and that the abnormality elimination period overlaps the long suspension period. The above configuration can eliminate the abnormality of the facility using the long suspension period, thereby effectively preventing an operation rate of the production line from decreasing.

Preferably, the notifying time setting unit sets the notifying time at the abnormality elimination period before an end date of the long suspension period. That is, the actual work for carrying-in and carrying-out are carried out in the latter half of the abnormality elimination period. Thus, the above configuration can more effectively prevents the operation rate of the production line from decreasing.

Preferably, the characteristic information further includes information related to whether the part is in stock, and the abnormality elimination period estimation unit estimates the abnormality elimination period in such a way that the abnormality elimination period becomes longer when the part is out of stock than the abnormality elimination period when the part is in stock. The above configuration makes it easy to ensure a period required for procuring the part, thereby reliably eliminating the abnormality of the facility before the abnormality occurrence time.

Preferably, the abnormality elimination period estimation unit estimates the abnormality elimination period in such a way that the abnormality elimination period becomes longer when the part is out of stock than the abnormality elimination period when the part is in stock at least for a period necessary to procure the part. According to the above configuration, the period required for procuring the part can be ensured, and thus the above configuration can more reliably eliminate the abnormality of the facility before the abnormality occurrence time.

The present disclosure further provides an abnormality sign notifying method that includes: an abnormality occurrence time estimation step of estimating an abnormality occurrence time at which an abnormality occurs in a facility based on information related to an operation of the facility installed in a production line, an abnormality elimination period estimation step of estimating an abnormality elimination period required for eliminating the abnormality of the facility based on characteristic information related to a replacement required part necessary for eliminating the abnormality of the facility, a notifying time setting step of setting a notifying time at which a sign of the abnormality of the facility is notified at the abnormality elimination period before the abnormality occurrence time, and a notifying step of notifying the sign of the abnormality of the facility at the notifying time. The above method achieves the notifying time that is flexibly set by taking the characteristic information into account.

The present disclosure further provides a program for causing a computer to execute the above abnormality sign notifying method.

The present disclosure can flexibly set the notifying time by taking the characteristic information into account.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 7 is a view exemplifying ranking of the abnormality data made by an abnormality data determination unit according to the first embodiment;

FIG. 13 is a view showing an example in which the abnormality sign notifying system according to the first embodiment is applied to a factory;

FIG. 14 is a view exemplifying different progress levels of abnormalities depending on a usage environment and a usage mode with the same model of the robots;

FIG. 17 is a view exemplifying maintenance management data stored in a data storage unit of a monitoring apparatus;

DESCRIPTION OF EMBODIMENTS

First Embodiment

Hereinafter, embodiments of the present disclosure will be described with reference to the drawings.

Figure 1:
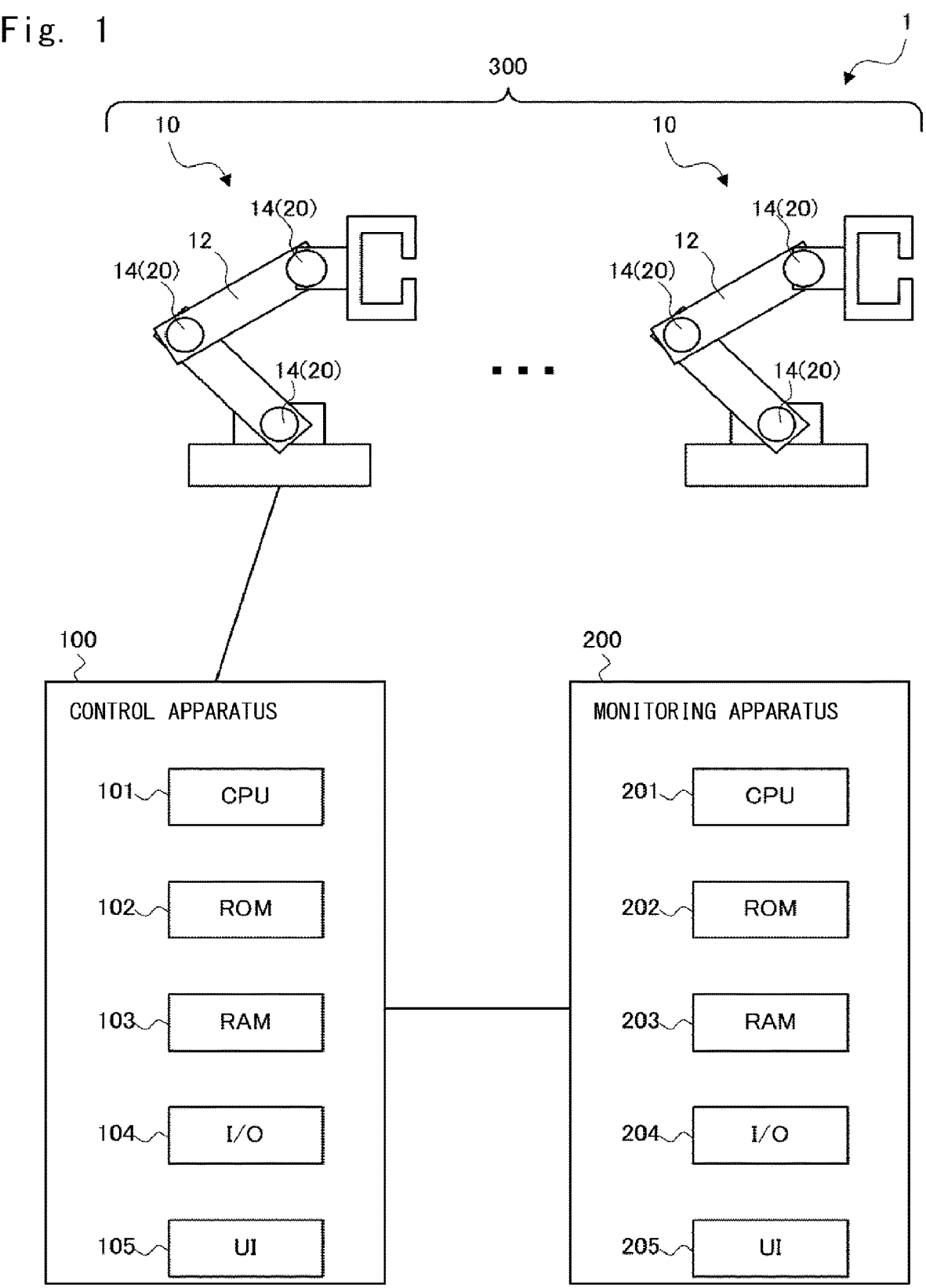
FIG. 1 is a view showing an abnormality sign notifying system according to a first embodiment.
Figure 2:
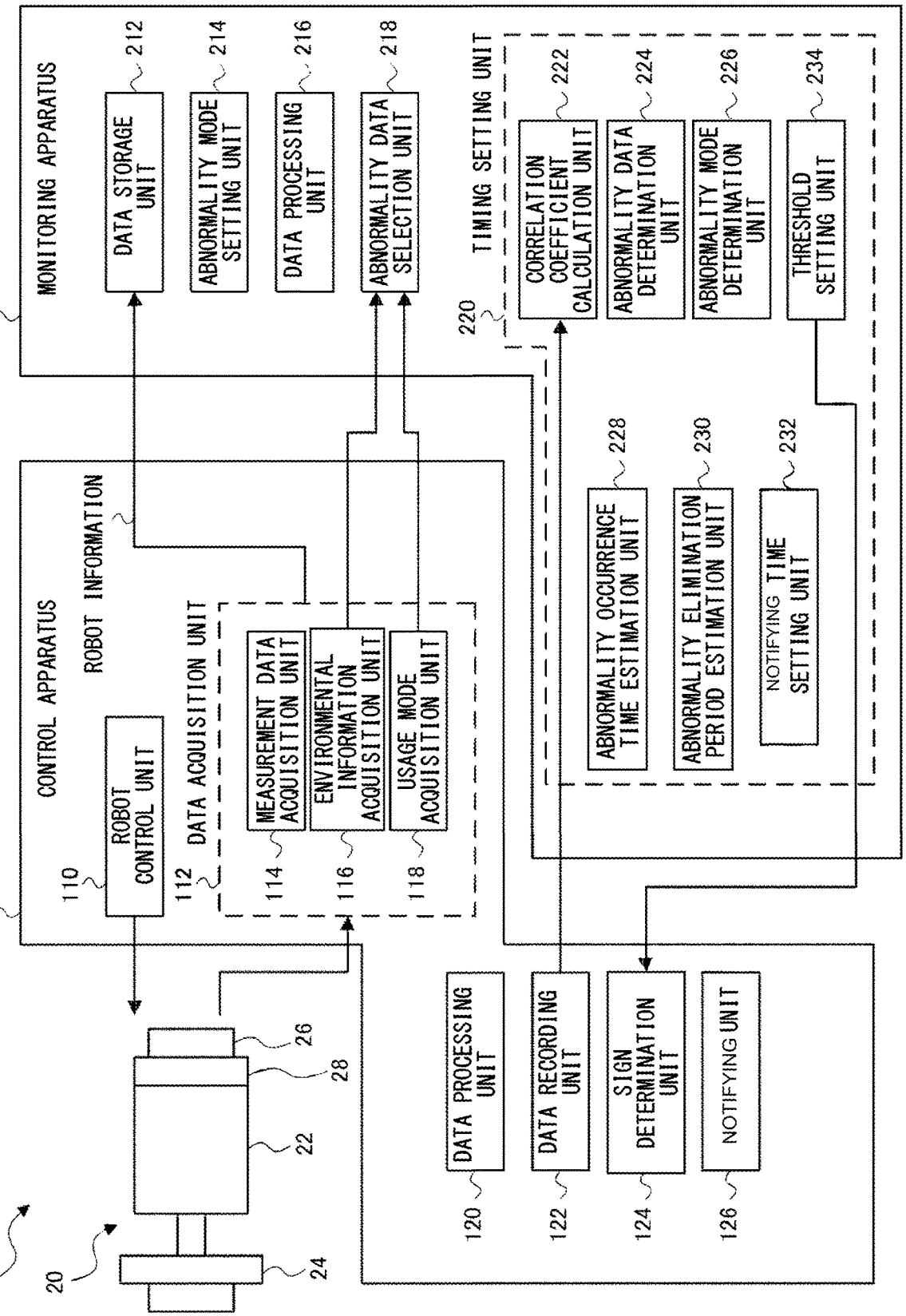
FIG. 2 is a functional block diagram showing a configuration of respective apparatuses of the abnormality sign notifying system according to the first embodiment.

FIG. 1 is a view showing an abnormality sign notifying system 1 according to a first embodiment. FIG. 2 is a functional block diagram showing a configuration of respective apparatuses of the abnormality sign notifying system 1 according to the first embodiment. The abnormality sign notifying system 1 includes a plurality of robots 10 installed in a production line 300, a control apparatus 100, and a monitoring apparatus 200. The robot 10 is a specific example of a facility. The abnormality sign notifying system 1 is provided, for example, in a factory with the production line 300 that includes a plurality of processes. Then, the abnormality sign notifying system 1 is configured to notify a sign of an abnormality occurrence in the robot 10 that is used in each of the plurality of processes.

The robot 10 is, for example, a device such as an industrial robot. The control apparatus 100 may be provided for each of the plurality of robots 10. At least one monitoring apparatus 200 needs to be provided in the abnormality sign notifying system 1. The control apparatus 100 is, for example, communicably connected to the robot 10 in a wired or wireless manner. The monitoring apparatus 200 is, for example, communicably connected to the control apparatus 100 in a wired or wireless manner. The control apparatus 100 performs processing necessary for controlling an operation of the corresponding robot 10. The monitoring apparatus 200 performs processing necessary for diagnosing an abnormality of each of the plurality of robots 10. Further, the monitoring apparatus 200 stores data related to the robot 10 in which an abnormality such as a failure occurred in the past.

The robots 10 are installed, for example, in the vicinity of the vehicle production line 300. The robot 10 is a robot for performing a predetermined work such as welding (e.g., spot welding) and coating (e.g., intermediate coating or top coating) on vehicles. The robot 10 includes one or more arms 12. The arm 12 includes one or more joints 14. The joint 14 includes a motor apparatus 20. The motor apparatus 20 includes a motor 22 that drives the joint 14 and a speed reducer 24 for transmitting power of the motor 22 to the joint 14. The motor apparatus 20 further includes a brake 26 that brakes rotation of the motor 22. The motor apparatus 20 further includes an encoder 28 that detects a rotation angle of the motor 22. The control apparatus 100 operates the joint 14 by controlling operations of the motor 22 and the brake 26. In this way, the robot 10 is configured to perform a desired operation. That is, the robot 10 is a joint drive robot that operates by driving the joint 14.

The control apparatus 100 includes, for example, a function as a computer. The control apparatus 100 may be mounted inside the robot 10 or may be communicably connected to the robot 10 in a wired or wireless manner. The control apparatus 100 may be a control panel or an operation panel installed in the vicinity of the robot 10. The control apparatus 100 includes a CPU (Central Processing Unit) 101, a ROM (Read Only Memory) 102, a RAM (Random Access Memory) 103, an I/O (Input/Output) 104, and a UI (User Interface) 105 as hardware.

The CPU 101 includes a function as a processing device that performs control processing, calculation processing, and the like. The ROM 102 includes a function of storing a control program and a calculation program to be executed by the CPU 101. The RAM 103 includes a function of temporarily storing processing data and the like. The I/O 104 is an input/output apparatus. The I/O 104 inputs data and signals from the outside, for example, from the robot 10 or the monitoring apparatus 200, and outputs data and signals to the outside. The UI 105 is composed of, for example, an input device such as a keyboard and an output device such as a display. The UI 105 may be implemented as a touch panel in which the input device and the output device are integrated. Alternatively, the UI 105 may be a remote controller physically independent from the control apparatus 100 that includes a control panel and the like and is connected to the CPU 101 and the like of the control apparatus 100 in a wired or wireless manner. Note that the ROM 102 is configured to be capable of storing an operation program (teaching data) for controlling the robot 10.

The monitoring apparatus 200 includes, for example, a function as a computer. The monitoring apparatus 200 may be installed, for example, in a central monitoring room of a factory provided with the abnormality sign notifying system 1. The monitoring apparatus 200 includes a CPU 201, a ROM 202, a RAM 203, an I/O 204, and a UI 205 as hardware.

The CPU 201 includes a function as a processing device that performs control processing, calculation processing, and the like. The ROM 202 includes a function of storing a control program and a calculation program to be executed by the CPU 201. The RAM 203 includes a function of temporarily storing processing data and the like. The I/O 204 is an input/output apparatus. The I/O 204 inputs data and signals from the outside, for example, from the control apparatus 100, and outputs data and signals to the outside. The UI 205 is composed of, for example, an input device such as a keyboard and an output device such as a display. The UI 205 may be implemented as a touch panel in which the input device and the output device are integrated.

As shown in FIG. 2, the control apparatus 100 includes a robot control unit 110, a data acquisition unit 112, a data processing unit 120, a data recording unit 122, a sign determination unit 124, and a notifying unit 126. The data acquisition unit 112 includes a measurement data acquisition unit 114, an environmental information acquisition unit 116, and a usage mode acquisition unit 118. Each component of the control apparatus 100 shown in FIG. 2 can be implemented by the CPU 101 executing the program stored in the ROM 102. The control apparatus 100 may record a necessary program on a specified non-volatile recording medium, and install the program as necessary. Each component of the control apparatus 100 shown in FIG. 2 is not limited to be implemented by software as described above, and instead may be implemented by hardware such as some kind of a circuit element.

One or more of the components of the control apparatus 100 shown in FIG. 2 may be implemented by an apparatus different from the control apparatus 100. The data recording unit 122, the sign determination unit 124, and the notifying unit 126 may be implemented by, for example, an apparatus different from the control apparatus 100 (e.g., the monitoring apparatus 200). That is, an apparatus that controls the robot 10 and acquires necessary data and information may be a physically separate apparatus from an apparatus that diagnoses an abnormality of the robot 10.

As shown in FIG. 2, the monitoring apparatus 200 includes a data storage unit 212, an abnormality mode setting unit 214, a data processing unit 216, an abnormality data selection unit 218, and a timing setting unit 220. The timing setting unit 220 includes a correlation coefficient calculation unit 222, an abnormality data determination unit 224, an abnormality mode determination unit 226, an abnormality occurrence time estimation unit 228, an abnormality elimination period estimation unit 230, a notifying time setting unit 232, and a threshold setting unit 234. Each component of the monitoring apparatus 200 shown in FIG. 2 can be implemented by the CPU 201 executing the program stored in the ROM 202. Like the control apparatus 100, the monitoring apparatus 200 may record a necessary program on a specified non-volatile recording medium, and install the program as necessary. Note that, like the control apparatus 100, each component of the monitoring apparatus 200 shown in FIG. 2 is not limited to be implemented by software as described above, and instead may be implemented by hardware such as some kind of a circuit element. One or more of the components of the monitoring apparatus 200 shown in FIG. 2 may be implemented by an apparatus different from the monitoring apparatus 200 (e.g., the control apparatus 100).

Next, each component of the control apparatus 100 shown in FIG. 2 will be described.

The robot control unit 110 controls the operation of the robot 10. The robot control unit 110 may control the robot 10 in accordance with the operation program stored in the ROM 102. Specifically, the robot control unit 110 controls the operation of the motor apparatus 20 of the robot 10. That is, the robot control unit 110 controls the motor 22 and the brake 26 of the motor apparatus 20. More specifically, the robot control unit 110 transmits a command current indicating a command current value, which is a control value (a command value), to the motor 22 in order to operate the motor 22. The robot control unit 110 receives an encoder value indicating the rotation angle of the motor 22 from the encoder 28. The robot control unit 110 may rotate the motor 22 using the rotation angle indicated by the encoder value by, for example, feedback control in such a way that the joint 14 of the robot 10 performs a predetermined operation. Further, the robot control unit 110 transmits a brake signal (a brake release signal) to the brake 26 in order to release the brake 26.

The data acquisition unit 112 acquires robot information, which is data (information) related to the robot 10, from the motor apparatus 20 (the motor 22). The robot information is one specific example of the information related to the operation of the robot 10. At this time, the data acquisition unit 112 may acquire the robot information together with identification information of the robot 10. The data acquisition unit 112 transmits the acquired robot information to the monitoring apparatus 200. The robot information may include the identification information of the robot 10, measurement data, environmental information, and usage mode information, which will be described later.

The measurement data acquisition unit 114 acquires the measurement data measured by the motor apparatus 20. The measurement data is raw data indicating an operation state of the robot 10 (the motor apparatus 20). Thus, the measurement data acquisition unit 114 may include a function as an operation state acquisition unit that acquires the operation state of the robot 10. The measurement data is, for example, the command current value, the brake signal, and the encoder value. However, the measurement data is not limited to these values. The measurement data acquisition unit 114 may acquire, for example, a motor current value.

The environmental information acquisition unit 116 acquires the environmental information indicating an environment in which the robot 10 is used. The environmental information is, for example, an ambient temperature at which the robot 10 is used. The environmental information acquisition unit 116 may acquire the ambient temperature, for example, by acquiring an encoder temperature from the encoder 28. Note that the encoder temperature may be measured by a temperature sensor or the like provided in the encoder 28. The measurement data and the environmental information are acquired in time series. The measurement data and the environmental information may be measured, for example, every few seconds (e.g., within 10 seconds). The measurement data and the environmental information include a measurement value and a measured time when the measurement value is measured. The "measured time" here is an elapsed time since the start of use of the robot 10.

The usage mode acquisition unit 118 acquires usage mode information indicating a usage mode of the robot 10 to be controlled by the control apparatus 100. Note that the usage mode acquisition unit 118 may store the usage mode information in advance. The usage mode here indicates how the robot 10 (and the corresponding control apparatus 100) is used. The usage mode may include, for example, a model (such as a model number) of the robot 10. The usage mode may further include processing processes (a welding process, a coating process, etc.) in which the robot 10 is used. The usage mode may further include a mounting direction of the robot 10 in the factory.

The data processing unit 120 processes the measurement data acquired by the measurement data acquisition unit 114 and converts it into data for determination. The data for determination is used for determining an abnormality sign, which will be described later. The data for determination indicates the operation state of the robot 10. That is, the data processing unit 120 may include a function as an operation state acquisition unit that acquires the operation state of the robot 10. The measurement data is obtained in time series. Thus, the data for determination indicates the operation state in time series. Examples of the data for determination include an average command current value, a maximum current value, a standard deviation, an amplitude, and a suction time, although the data for determination is not limited to them. Hereinafter, the term "operation state data" including the measurement data and data for determination may be used.

The data processing unit 120 acquires, for example, the average command current value, the maximum current value, the standard deviation, and the amplitude, using the command current value. The average command current value is, for example, an average value of the command current values in one cycle of the operation of the robot 10. The maximum current value is, for example, a maximum command current value in one cycle of the operation of the robot 10. The standard deviation is, for example, a deviation from the average value of the command current values. The amplitude is an amplitude of the command current value fluctuations (a difference between maximum and minimum values in one cycle). Note that the data processing unit 120 may acquire an average value of the amplitudes (an average value in one cycle of the operation of the robot 10) or a maximum value of the amplitudes (a maximum value in one cycle of the operation of the robot 10).

The average command current value, the maximum current value, the standard deviation, and the amplitude tend to increase as the degradation of the bearing or the gear (the speed reducer 24) of the motor apparatus 20 progresses. Thus, the average command current value, the maximum current value, the standard deviation, and the amplitude may be used to determine a sign of an abnormality mode related to the bearing or gear.

Further, the data processing unit 120 acquires a motor rotation speed using the encoder value. The motor rotation speed may be calculated from an amount of change in the encoder value (rotation angle). The data processing unit 120 may acquire the average command current value, the maximum current value, the standard deviation, the amplitude, and the like using the command current value when the motor rotation speed is substantially constant (the amplitude of the rotation speed fluctuation falls within a certain range). By doing so, the influence of the fluctuation of the motor rotation speed can be eliminated from the average command current value, the maximum current value, the standard deviation, the amplitude, and the like. That is, the average command current value, the maximum current value, the standard deviation, the amplitude, and the like more reliably indicate the progress of degradation (a sign of an abnormality) of each part of the robot 10.

Further, the data processing unit 120 acquires the suction time from the brake signal. The suction time is a time from when the brake signal (the brake release signal) is transmitted to when the brake 26 is actually released and then the joint 14 of the robot 10 becomes operable. Thus, the data processing unit 120 may also use, as the suction time, a difference between the time when the brake signal is generated and the time when the robot 10 actually becomes operable (e.g., the time when the encoder value rises or the time when the motor current value rises). The suction time tends to become longer as the disc of the brake 26 wears out. Therefore, the suction time may be used to determine a sign of an abnormality mode related to the brake.

The data recording unit 122 stores the operation state data (the data for determination) acquired by the data processing unit 120. In this case, the data recording unit 122 may record the operation state data in a state represented by a waveform in time series. Note that the data recording unit 122 may record only the data for determination.

The sign determination unit 124 determines the sign of the abnormality occurrence in the robot 10. That is, the sign determination unit 124 determines whether there is a possibility that some abnormality may occur in the robot 10 anytime soon (within a predetermined time, for example, within 30 days). Specifically, when one or more pieces of the operation state data (the data for determination) exceeds a threshold set by the threshold setting unit 234, the sign determination unit 124 determines that there is the sign of the abnormality occurrence in the robot 10. Details will be described later. Hereinafter, the robot 10 for which it is to be determined whether an abnormality sign occurs therein (i.e., the robot 10, an abnormality sign of which is to be notified) is sometimes referred to as a target robot (a target facility).

The notifying unit 126 notifies the abnormality sign of the robot 10 when the sign determination unit 124 determines that there is the sign of the abnormality occurrence in the robot 10. The notifying unit 126 may notify the abnormality sign by, for example, controlling the UI 105 such as a speaker to generate an alarm sound. Alternatively, the notifying unit 126 may notify the abnormality sign by, for example, controlling the UI 105 such as the display to visually display an alarm.

Next, each component of the monitoring apparatus 200 shown in FIG. 2 will be described.

The data storage unit 212 obtains the robot information from the data acquisition unit 112 of the control apparatus 100 and stores it. In particular, the data storage unit 212 stores the robot information related to the robot 10 in which an abnormality such as a failure or malfunction has occurred.

When an abnormality occurs in a certain robot 10, the abnormality mode setting unit 214 associates an abnormality mode (a failure mode) indicating a type of the abnormality (e.g., a type of the abnormality and a member in which the abnormality has occurred) with the robot information related to the robot 10). Thus, the robot information related to the robot 10 in which the abnormality has occurred, which is stored in the data storage unit 212, includes information indicating the abnormality mode (abnormality mode information).

Hereinafter, the robot information related to the robot 10 in which the abnormality has occurred is sometimes referred to as abnormal robot information. The abnormal robot information may include the identification information of the robot 10, the abnormality mode information, the measurement data, the environmental information, and the usage mode information. The operation state data related to the robot 10 in which the abnormality has occurred is sometimes referred to as "abnormality data". That is, the abnormality data corresponds to the operation state data indicating the operation state of the robot 10 in which the abnormality occurred in the past. The abnormality mode setting unit 214 associates the abnormality mode with each piece of the abnormality data.

The data processing unit 216 may perform substantially the same processing as that of the data processing unit 120 of the control apparatus 100. That is, the data processing unit 216 processes the measurement data stored in the data storage unit 212 and converts it into the data for determination. As described above, the data for determination indicates the operation state of the robot 10. Thus, the data processing unit 216 may include a function as an operation state acquisition unit that acquires the operation state of the robot 10.

The abnormality data selection unit 218 selects the abnormality data related to the robot 10 having the usage environment and usage mode similar to those of the target robot from among a plurality of pieces of the abnormality data (the abnormal robot information) stored in the data storage unit 212. That is, the abnormality data selection unit 218 narrows down one or more pieces of the abnormality data in order to select the abnormality data related to the robot 10 having the usage environment and usage mode similar to those of the target robot based on the environmental information related to the target robot and the usage mode information related to the target robot. Details will be described later.

The timing setting unit 220 sets a timing for notifying the abnormality sign based on the abnormality data selected by the abnormality data selection unit 218 and the operation state data of the target robot corresponding to the selected abnormality data. Specifically, the timing setting unit 220 sets a threshold related to the operation state data based on a correlation between the selected abnormality data and the operation state data of the target robot. Details will be described later.

The correlation coefficient calculation unit 222 calculates a correlation coefficient between the abnormality data selected by the abnormality data selection unit 218 and the operation state data of the target robot. The abnormality data determination unit 224 determines the abnormality data having the largest correlation coefficient. The abnormality mode determination unit 226 determines the abnormality mode of the abnormality data having the largest correlation coefficient. The abnormality occurrence time estimation unit 228 estimates an abnormality occurrence time at which an abnormality occurs in the target robot based on the abnormality data identified by the abnormality data determination unit 224. The abnormality elimination period estimation unit 230 estimates an abnormality elimination period required for eliminating the abnormality of the target robot based on characteristic information related to a part necessary for eliminating the abnormality of the target robot. The notifying time setting unit 232 sets a notifying time (a notifying timing) when a sign of the abnormality of the target robot is notified at the abnormality elimination period before the abnormality occurrence time. The threshold setting unit 234 sets a value of the abnormality data at the notifying time as a threshold.

Figure 3:
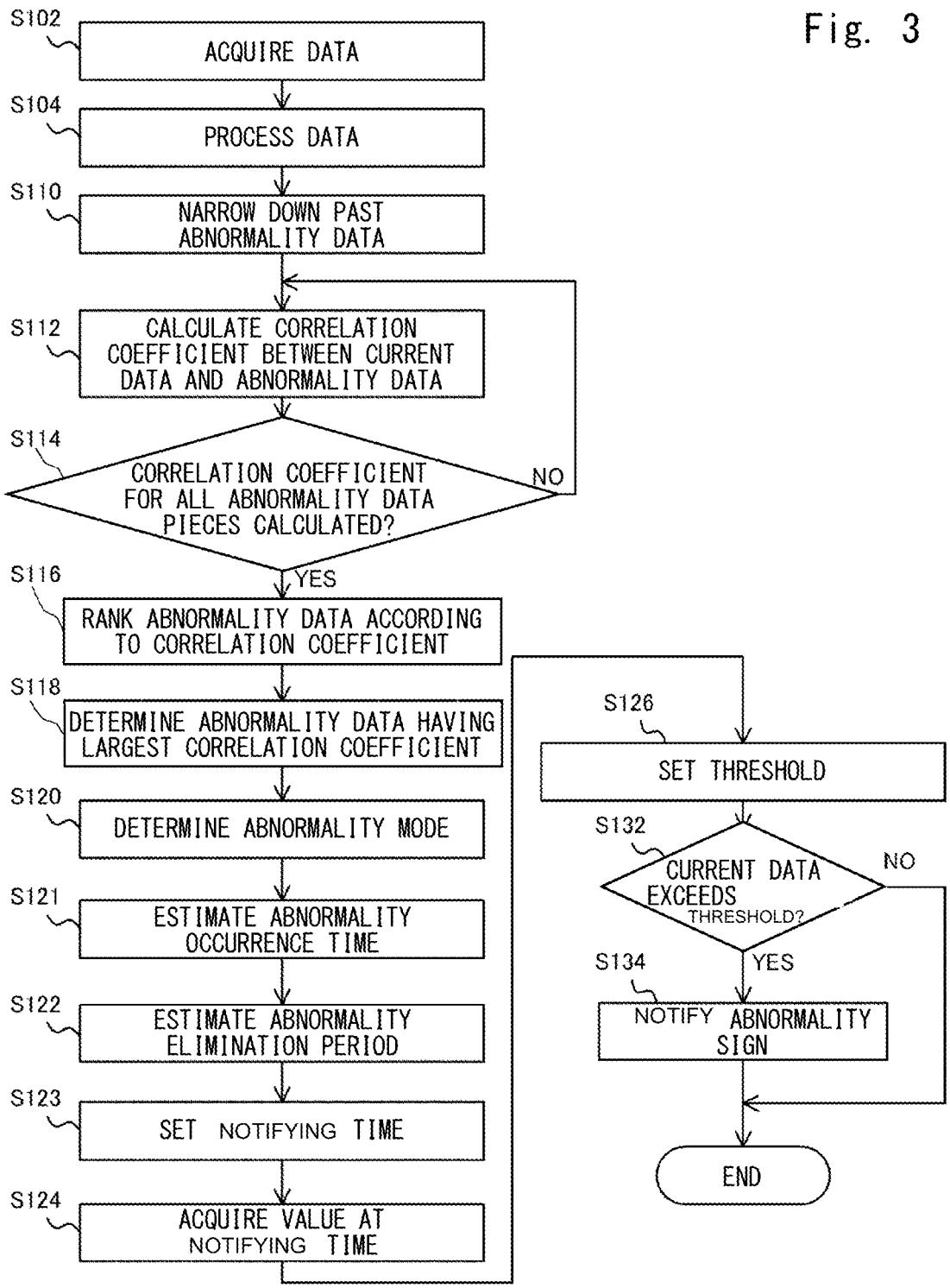
FIG. 3 is a flowchart showing an abnormality sign notifying method executed by the abnormality sign notifying system according to the first embodiment.

FIG. 3 is a flowchart showing an abnormality sign notifying method executed by the abnormality sign notifying system 1 according to the first embodiment. The abnormality sign notifying system 1 performs processing shown in FIG. 3 for each target robot for, as an example, once a day.

The control apparatus 100 acquires the robot information (Step S102). Specifically, as described above, the data acquisition unit 112 of the control apparatus 100 acquires the robot information (the measurement data) of the target robot. Then, the control apparatus 100 performs necessary processing on the measurement data (Step S104). Specifically, as described above, the data processing unit 120 of the control apparatus 100 processes the measurement data of the target robot and acquires the data for determination. At this time, the data processing unit 120 may generate a waveform representing the data for determination related to the target robot in time series. The data for determination (the operation state data) is sometimes referred to as "current data", meaning that it is related to the robot 10 currently in operation (the measurement data of which is being measured) in order to compare the data for determination of the target robot with the abnormality data related to the robot 10 in which an abnormality occurred in the past.

The monitoring apparatus 200 narrows down the stored past abnormality data according to the usage mode and usage environment of the target robot (Step S110). Specifically, the abnormality data selection unit 218 of the monitoring apparatus 200 acquires the environmental information related to the target robot from the environmental information acquisition unit 116. The abnormality data selection unit 218 further acquires the usage mode information related to the target robot from the usage mode acquisition unit 118. The abnormality data selection unit 218 narrows down the many pieces of the abnormality data (the abnormal robot information) stored in the data storage unit 212 using the acquired environmental information and usage mode information to the abnormality data (the abnormal robot information) necessary for setting the notifying time of the abnormality sign, which will be described later.

Figure 4:
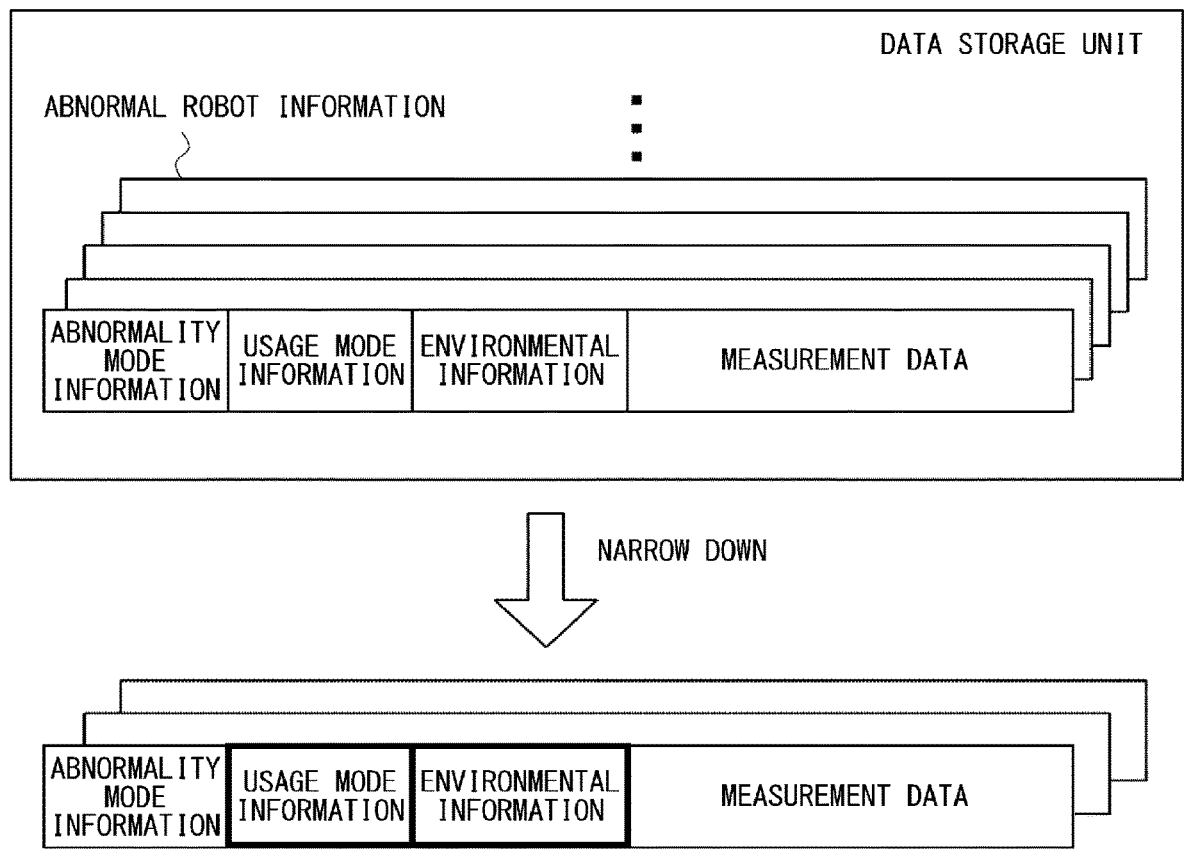
FIG. 4 is a view for describing narrowing down of abnormality data according to the first embodiment.

FIG. 4 is a view for describing the narrowing down of the abnormality data according to the first embodiment. As shown in FIG. 4, the data storage unit 212 stores many pieces of the abnormal robot information. Each abnormal robot information piece includes the abnormality mode information, the usage mode information, the environmental information, and the measurement data. As described above, the measurement data may include parameters such as the command current value, the brake signal, and the encoder value. That is, the data storage unit 212 stores the abnormality data (the operation state data of the robot 10 in which the abnormality has occurred) in association with the usage mode information and the environmental information.

The abnormality data selection unit 218 selects the abnormal robot information that includes the usage mode information indicating the same usage mode as the usage mode indicated by the usage mode information related to the target robot and includes the environmental information indicating the usage environment which is the same as or similar to the usage environment indicated by the environmental information related to the target robot. The following is an explanation of "the same or similar usage environment (the usage environment which is the same as or similar)". For example, the environmental information indicating a temperature change in which the correlation coefficient with a temperature change in time series related to the target robot is larger than or equal to a predetermined value may be "environmental information indicating the same or similar usage environment". When a difference between an average value of the temperature related to the target robot and an average value of the temperature related to the abnormal robot information is less than or equal to a predetermined value, the environmental information related to the abnormal robot information is sometimes referred to as the "environmental information indicating the same or similar usage environment". For example, when the usage mode information of the target robot indicates "model A" and "coating process", and the environmental information indicates "average temperature: 50 degrees", the abnormality data selection unit 218 may select, from the data storage unit 212, the abnormal robot information including the usage mode information indicating "model A" and "coating process" and the environmental information indicating the average temperature near "average temperature: 50 degrees".

Then, the data processing unit 216 converts the measurement data included in the abnormal robot information selected by the abnormality data selection unit 218 into the data for determination. The abnormality data is narrowed down based on the usage mode information and environmental information through the above processing.

Next, the monitoring apparatus 200 calculates the correlation coefficient between the current data and the abnormality data (Step S112). Specifically, the correlation coefficient calculation unit 222 calculates the correlation coefficient between the current data and the abnormality data. Next, when the correlation coefficients have not been calculated for all the abnormality data pieces (the abnormality modes) selected by the abnormality data selection unit 218 (NO in Step S114), the correlation coefficient calculation unit 222 calculates the correlation coefficient for the abnormality data for which the correlation coefficient has not been calculated. Then, when the correlation coefficients are calculated for all the abnormality data pieces (the abnormality modes) selected by the abnormality data selection unit 218 (YES in Step S114), the process proceeds to S116, which will be described later.

Figure 5:
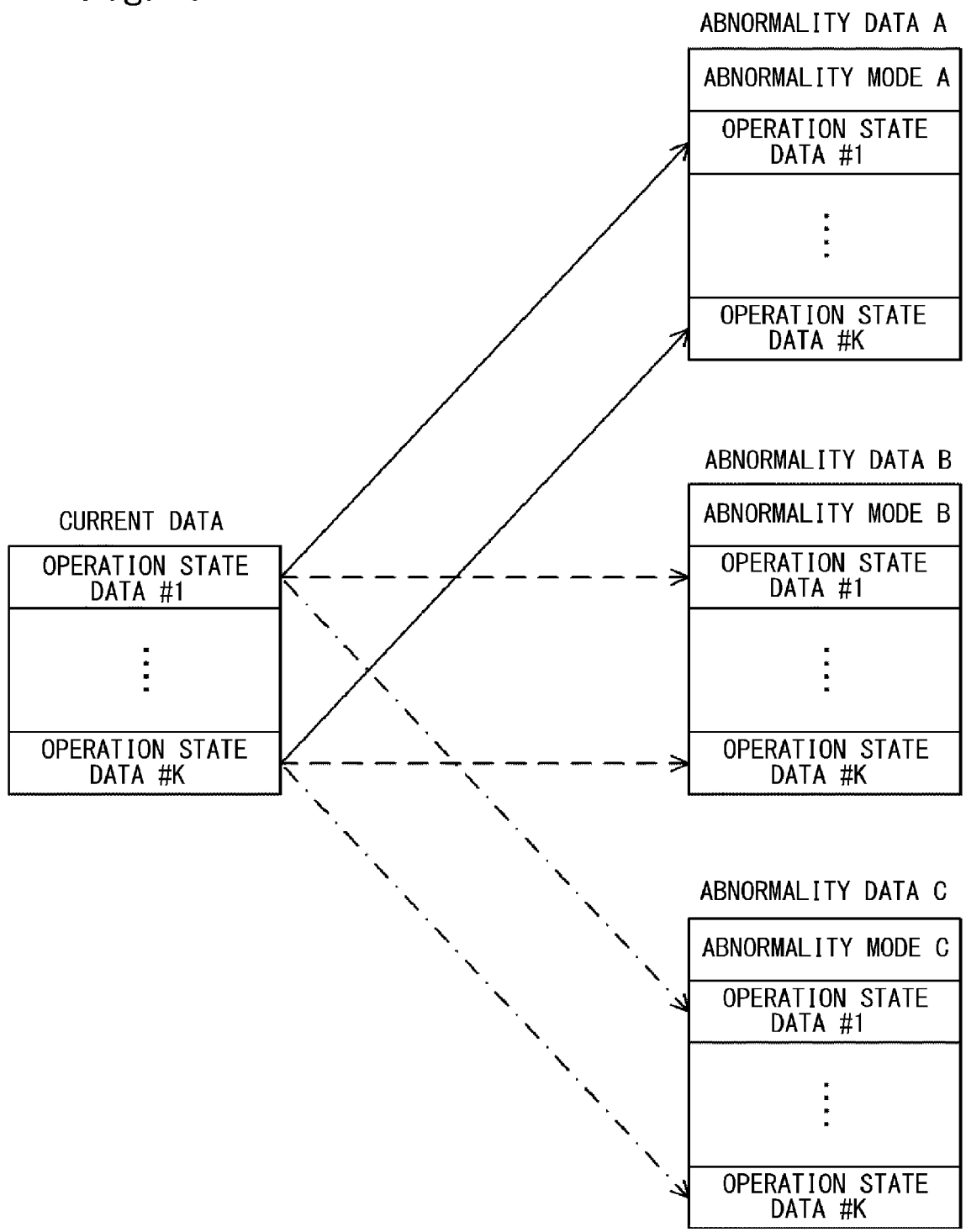
FIG. 5 is a view for describing calculation of a correlation coefficient between current data and the abnormality data according to the first embodiment.
Figure 6:
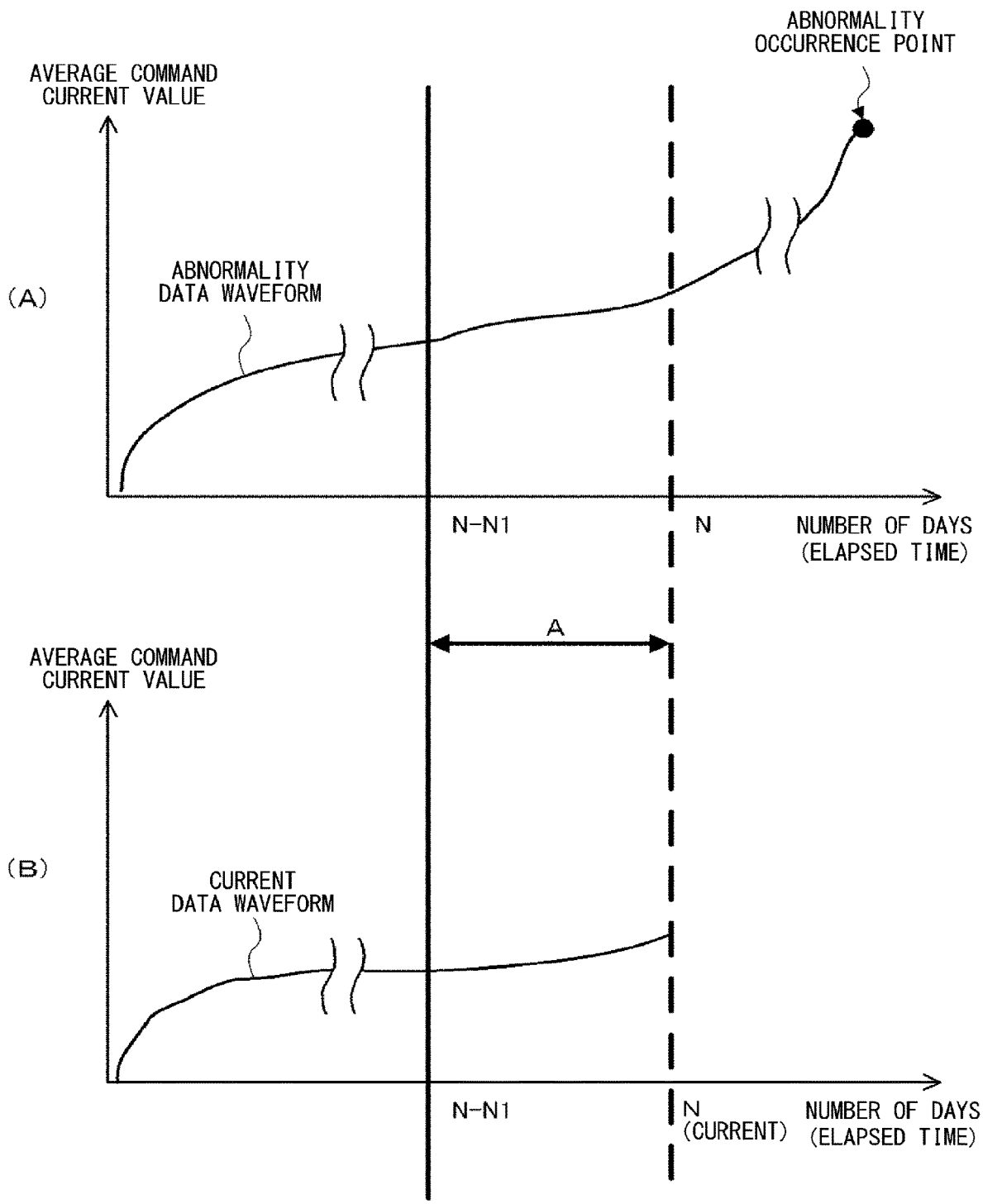
FIG. 6 is a view for describing calculation of a correlation coefficient between the current data and the abnormality data according to the first embodiment.

FIGS. 5 and 6 are views for describing the calculation of the correlation coefficient between the current data and the abnormality data according to the first embodiment. In the processing of S110, as shown in FIG. 5, suppose that abnormality data A, abnormality data B, and abnormality data C are selected. The current data includes a plurality of pieces of operation state data #1 to #K (K is an integer of 1 or greater). The operation state data #1 is, for example, the average command current value, and the operation state data #2 is, for example, the maximum current value. The operation state data #3 is, for example, the standard deviation, and the operation state data #4 is, for example, the amplitude. The operation state data #5 is, for example, the suction time. Like the current data, each piece of the abnormality data also includes a plurality of pieces of operation state data #1 to #K.

Further, an abnormality mode A, an abnormality mode B, and an abnormality mode C are associated with the abnormality data A, the abnormality data B, and the abnormality data C, respectively. The abnormality mode A is, for example, "flaking of the motor bearing". The abnormality mode B is, for example, "chipping of the speed reducer gear". The abnormality mode C is, for example, "foreign matter which has bitten into the motor bearing".

As indicated by the solid arrows in FIG. 5, the correlation coefficient calculation unit 222 calculates the correlation coefficient between the operation state data #1 of the current data and the operation state data #1 of the abnormality data A. Likewise, the correlation coefficient calculation unit 222 calculates the correlation coefficient between each piece of the operation state data #2 to #K of the current data and the operation state data #2 to #K of the abnormality data A, respectively. Further, as indicated by the dashed arrows in FIG. 5, the correlation coefficient calculation unit 222 calculates the correlation coefficient between each piece of the current operation state data #1 to #K of the current data and the operation state data #1 to #K of the abnormality data B, respectively. Furthermore, as indicated by the long dashed short dashed arrows in FIG. 5, the correlation coefficient calculation unit 222 calculates the correlation coefficient between each piece of the operation state data #1 to #K of the current data and the operation state data #1 to #K of the abnormality data C, respectively.

FIG. 6(A) shows a waveform (an abnormality data waveform) representing the abnormality data. The horizontal axis indicates the number of days (elapsed time) since the start of use of the robot 10 in which an abnormality related to this abnormality data has occurred. The vertical axis represents the value of the operation state data (the average command current value in the example of FIG. 6). FIG. 6(B) shows a waveform (a current data waveform) representing the current data. The horizontal axis indicates the number of days (elapsed time) since the start of use of the target robot. The vertical axis represents the value of the operation state data (the average command current value in the example of FIG. 6).

When the number of days since the start of use of the target robot is N days, the correlation coefficient calculation unit 222 calculates the correlation coefficient between the abnormality data and the current data for a period A, which is a period between the Nth day and (N−N1)th day before the Nth day. The N1 (the period A) may be, for example, one year (365 days), one month (30 days), or both.

When the correlation coefficient is calculated for all pieces of the abnormality data (the abnormality modes) (YES in S114), the monitoring apparatus 200 ranks the abnormality data (the operation state data) according to the correlation coefficient (Step S116). Then, the monitoring apparatus 200 determines the abnormality data (the operation state data) having the largest correlation coefficient (Step S118). Further, the monitoring apparatus 200 determines the abnormality mode related to the determined abnormality data (Step S120).

Specifically, as shown in FIG. 7, the abnormality data determination unit 224 of the monitoring apparatus 200 ranks the abnormality data (the operation state data) in descending order of the correlation coefficient. Then, the abnormality data determination unit 224 determines the abnormality data (the operation state data) having the largest correlation coefficient as data used for setting the notifying time of the abnormality sign. Further, the abnormality mode determination unit 226 of the monitoring apparatus 200 determines the abnormality mode related to the abnormality data (the operation state data) having the largest correlation coefficient as an abnormality mode that may occur in the target robot in the future. The abnormality mode determination unit 226 determines the abnormality mode in a manner described above, thereby making it possible to determine the abnormality mode that is predicted to occur in the target robot in the future. This enables the user to predict what kind of abnormality mode may occur in the target robot.

FIG. 7 is a view showing the ranking of the abnormality data made by the abnormality data determination unit 224 according to the first embodiment. In the example shown in FIG. 7, the correlation coefficient for the operation state data #4 (the amplitude) of the abnormality data A that is the abnormality mode A (flaking of the motor bearing) is 0.98. The correlation coefficient for the operation state data #2 (the maximum current value) of the abnormality data A that is the abnormality mode A is 0.88. The correlation coefficient for the operation state data #2 of the abnormality data B that is the abnormality mode B (chipping of the speed reducer gear) is 0.74. The correlation coefficient for the operation state data #3 (the standard deviation) for the abnormality data C that is the abnormality mode C (foreign matter which has bitten into the motor bearing) is 0.72.

Thus, the abnormality data determination unit 224 determines the operation state data #4 of the abnormality data A that is ranked first in the correlation coefficient ranking as the data to be used for setting the notifying time of the abnormality sign. Then, the abnormality mode determination unit 226 determines the abnormality mode A as the abnormality mode that may occur in the target robot in the near future.

Next, the abnormality occurrence time estimation unit 228 of the monitoring apparatus 200 estimates the abnormality occurrence time at which an abnormality occurs in the target robot based on the abnormality data identified by the abnormality data determination unit 224 (Step S121).

Figure 8:
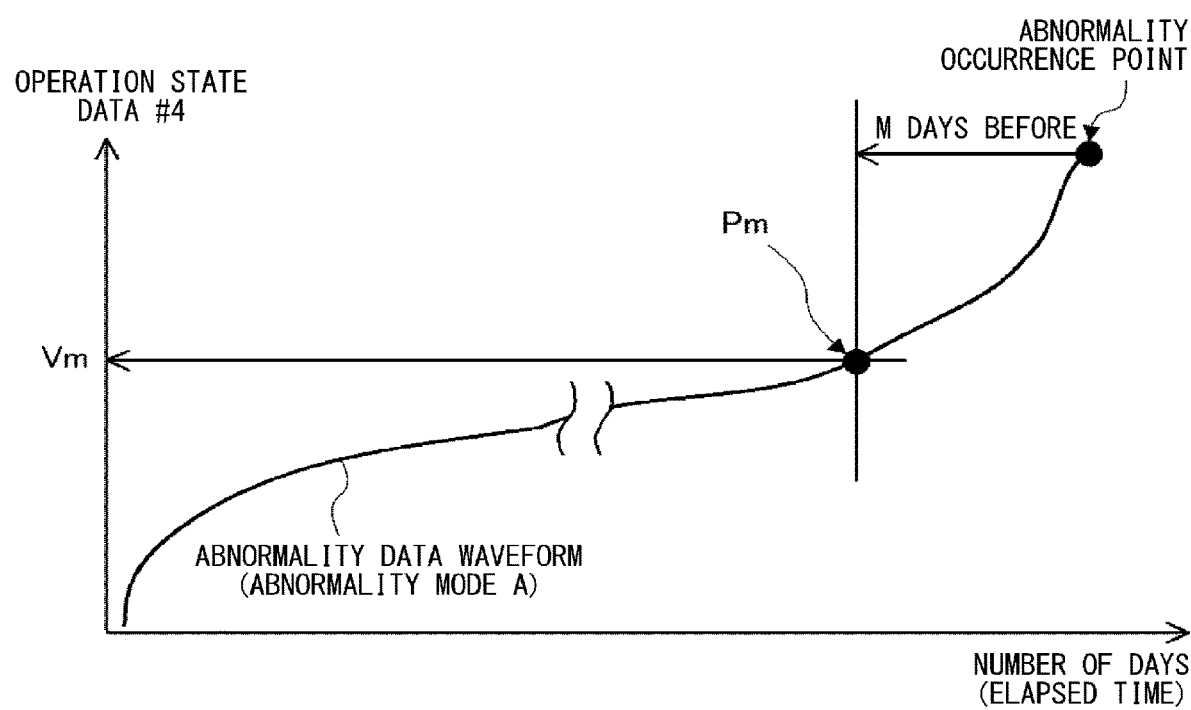
FIG. 8 is a view for describing a threshold setting method according to the first embodiment.

FIG. 8 is a view for describing a threshold setting method according to the first embodiment. FIG. 8 shows a waveform of the operation state data #4 (the amplitude) of the abnormality data A (the abnormality mode A; flaking of the motor bearing) determined in the processing of S118. The vertical axis indicates the value of the operation state data #4 in the abnormality data. The abnormality occurrence time estimation unit 228 refers to the last date of the operation state data #4 and estimates this last date as the abnormality occurrence time at which an abnormality occurs in the target robot.

Next, the abnormality elimination period estimation unit 230 of the monitoring apparatus 200 estimates the abnormality elimination period required for eliminating the abnormality of the target robot based on the characteristic information related to a part necessary for eliminating the abnormality of the target robot (Step S122). Details will be described later.

Next, the notifying time setting unit 232 of the monitoring apparatus 200 sets the notifying time when the sign of the abnormality of the target robot is notified at the abnormality elimination period before the abnormality occurrence time (Step S123). Details will be described later.

The threshold setting unit 234 of the monitoring apparatus 200 acquires the value of the abnormality data (the operation state data) determined in the processing of S118 at the abnormality elimination period before the abnormality occurrence time (Step S124). As a specific example, the monitoring apparatus 200 acquires the value of the abnormality data (the operation state data) M days before the abnormality occurrence time (Step S124). Then, the threshold setting unit 234 of the monitoring apparatus 200 sets the threshold using the value of the abnormality data (the operation state data) acquired in the processing of S124 (Step S126).

Figure 9:
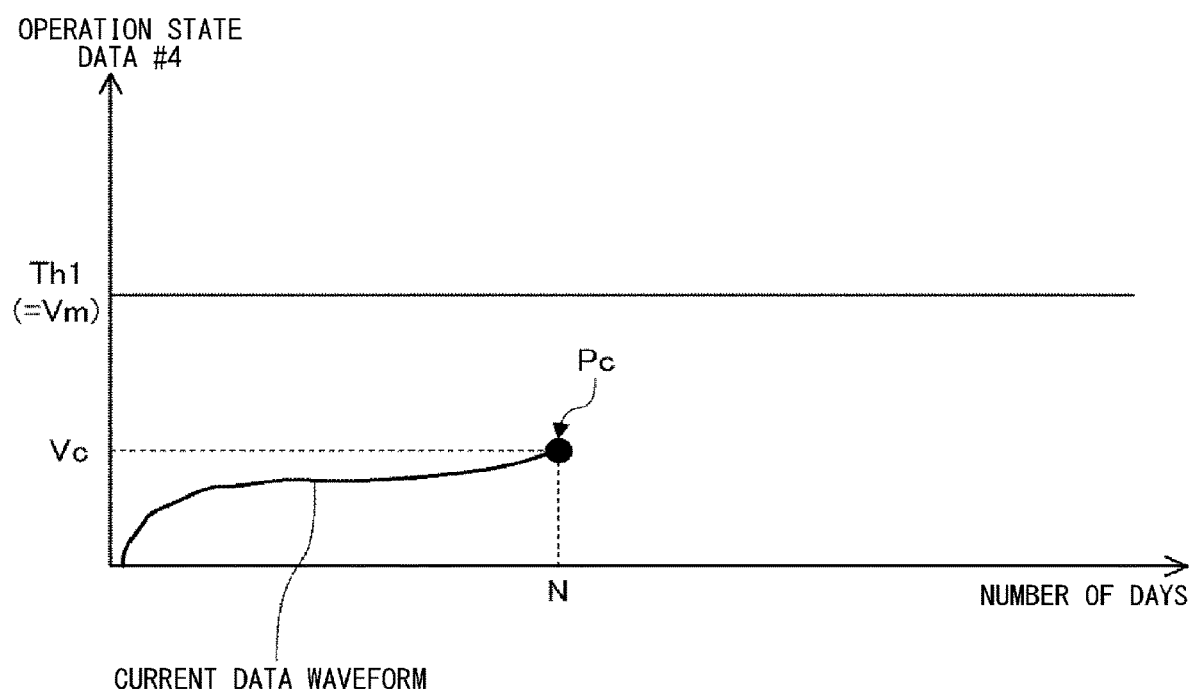
FIG. 9 is a view showing a state in which a threshold is set for the current data.

Specifically, as shown in FIG. 8, the threshold setting unit 234 of the monitoring apparatus 200 identifies a point Pm, which is at M days before the abnormality occurrence point, and acquires a value Vm of the operation state data #4 at the point Pm. Then, as shown in FIG. 9, which will be described later, the threshold setting unit 234 sets the value Vm as a threshold Th1 for the operation state data #4. In this way, the threshold setting unit 234 sets the threshold using the value Vm of the operation state data at the point Pm, which is at M days before the abnormality occurrence point. This enables the threshold to be more appropriately set.

FIG. 9 is a view showing a state in which the threshold is set for the current data. FIG. 9 shows a waveform of the current data for the operation state data #4 (the amplitude). Pc is a point indicating the latest current data and is a point at the Nth day from the start of use of the target robot. Vc indicates a value of the operation state data #4 at the current point Pc. Further, the threshold Th1 is equal to Vm shown in FIG. 8.

The control apparatus 100 determines whether the current data exceeds the threshold set in the processing of S126 (Step S132). The sign determination unit 124 of the control apparatus 100 determines whether the operation state data of the current data related to the threshold in the processing of S126 exceeds the threshold. Then, when the current data exceeds the threshold (YES in S132), the notifying unit 126 of the control apparatus 100 notifies the abnormality sign (Step S134).

In the case shown in FIG. 9, the sign determination unit 124 determines whether the current value Vc of the operation state data #4 of the current data exceeds the threshold Th1 (=Vm). Then, when Vc exceeds Th1, the notifying unit 126 notifies the abnormality sign.

Comparative Example

Next, a comparative example will be described.

Figure 10:
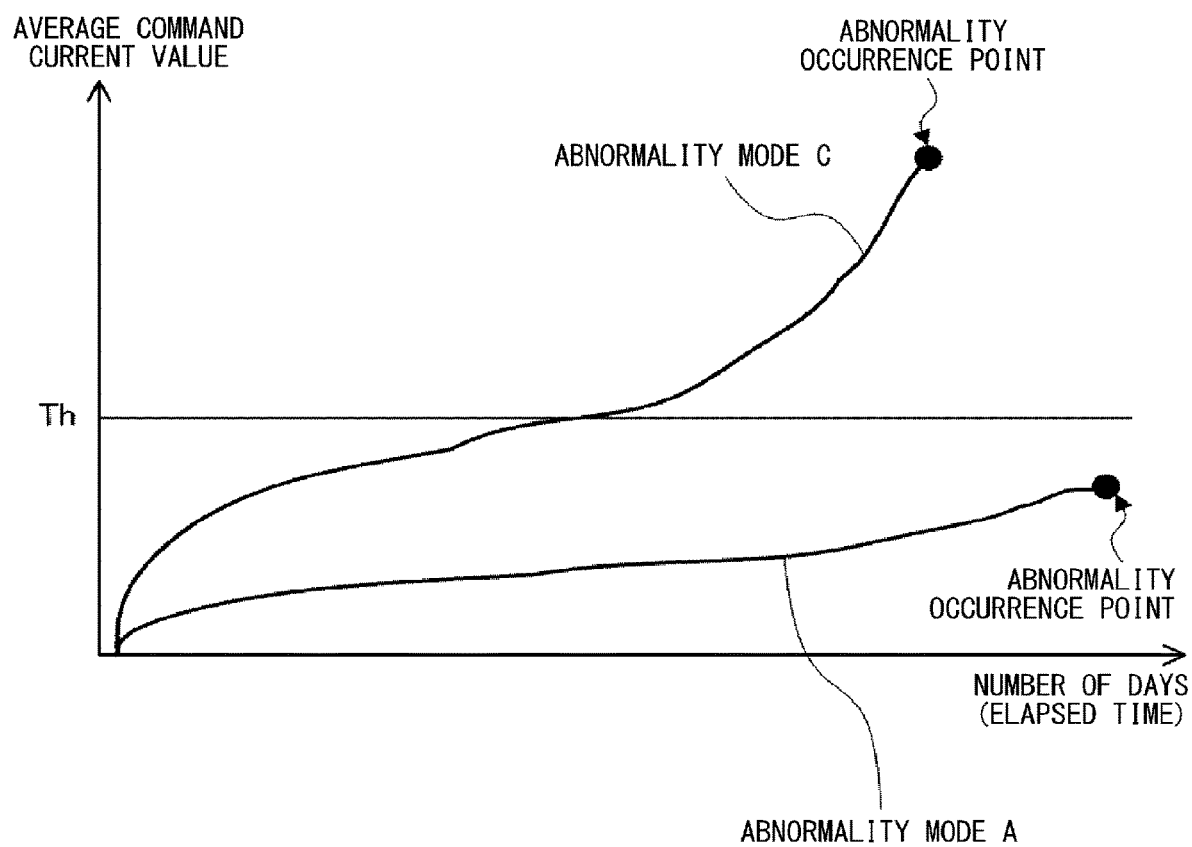
FIG. 10 is a view for describing a problem when an abnormality sign is notified using a predetermined threshold.
Figure 11:
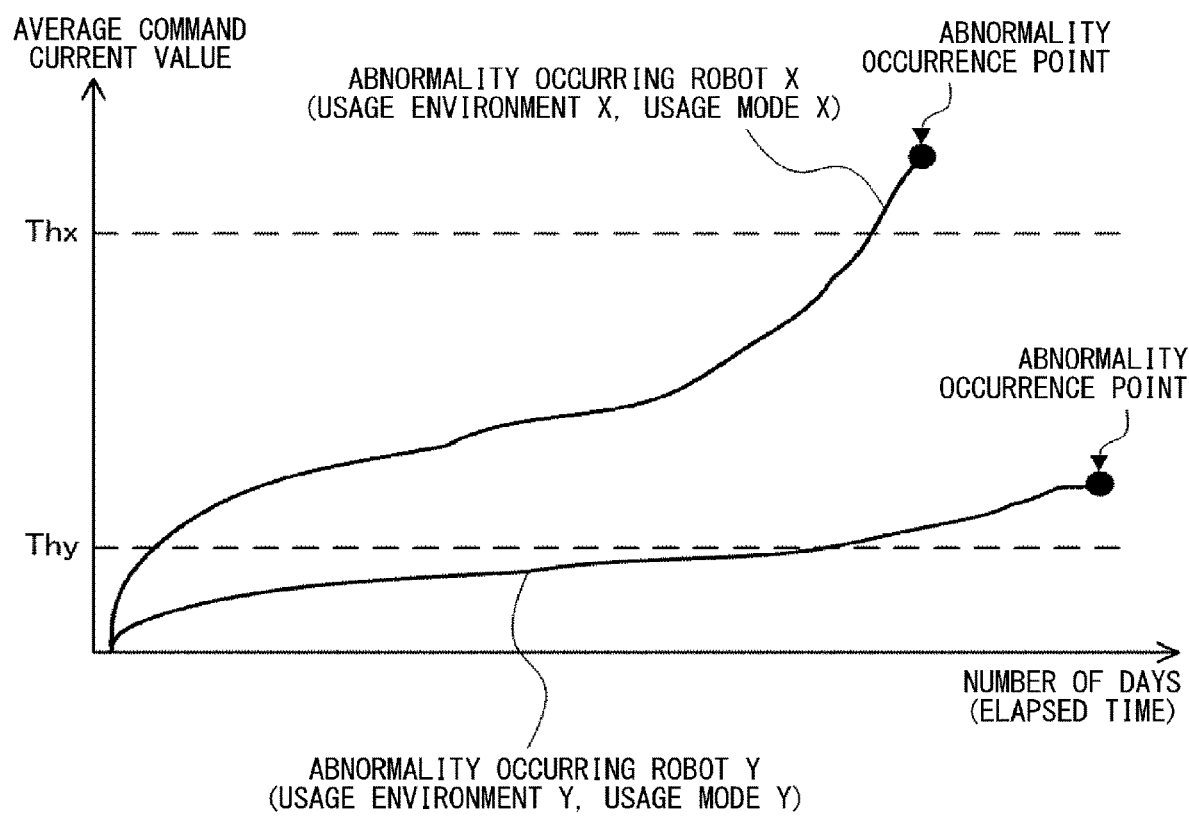
FIG. 11 is a view for describing a problem when an abnormality sign is notified using a predetermined threshold.

FIGS. 10 and 11 are views for describing a problem in notifying the abnormality sign using a predetermined threshold. FIG. 10 exemplifies a case where a predetermined threshold Th is set for the average command current value. In the example of FIG. 10, the threshold Th is determined as appropriate by the user based on the past abnormal occurrence history of the robot 10.

FIG. 10 shows a change of the average command current value of each of different abnormality modes (the abnormality modes A and C) over time, with the same model and part in which an abnormality has occurred. As shown in FIG. 10, the average command current value in the abnormality mode A changes more gradually than the average command current value in the abnormality mode C does. The threshold Th is larger than the value of the average command current value at the abnormality occurrence point in the abnormality mode A and is much smaller than the value of the average command current value at the abnormality occurrence point in the abnormality mode C.

In this case, when an abnormality of the abnormality mode A occurs in the robot 10, the abnormality may occur before the average command current value reaches the threshold Th. In such a case, an abnormality sign is not notified even though the abnormality has occurred. In other words, when the change in the operation state data over time is small as in the abnormality mode A, an abnormality sign may be "overlooked".

Moreover, when an abnormality of the abnormality mode C occurs in the robot 10, the average command current value may reach the threshold Th long before the abnormality occurs. In such a case, an abnormality sign is notified even though there is no abnormality sign. In other words, the notification of the abnormality sign is too early. That is, when the change in the operation state data over time is large as in the abnormality mode C, an "overdetection" of the abnormality sign may occur.

On the other hand, the abnormality sign notifying system 1 according to this embodiment sets the threshold Th1 using the abnormality data having a high (strong) correlation with the current data. This effectively prevents the above-mentioned "overlooking" and the "overdetection" of the abnormality sign from occurring. Thus, the abnormality sign notifying system 1 according to this embodiment can notify the abnormality sign at a more appropriate timing.

FIG. 11 shows changes of the average command current values of an abnormality occurring robot X (usage environment X, usage mode X) and an abnormality occurring robot Y (usage environment Y, usage mode Y). The abnormality modes are the same while the usage environments and usage modes differ from each other in the abnormality occurring robots X and Y. As shown in FIG. 11, the average command current value of the abnormality occurring robot Y changes more gradually than the average command current value of the abnormality occurring robot X does.

Here, suppose that the abnormality data of the abnormality occurring robot X is extracted from the data storage unit 212, and a threshold Thx is set using the average command current value of the abnormality occurring robot X. In this case, an abnormality sign of the robot Y (usage environment Y, usage mode Y) which is different from the abnormality occurring robot X in its usage environment and usage mode is notified using this threshold Thx. At this time, an abnormality may occur before the average command current value reaches the threshold Thx. In such a case, the abnormality sign is not notified even though the abnormality has occurred. That is, when the threshold is set using the abnormality data of the abnormality occurring robot in which the operation state data changes a lot, the abnormality sign of the robot in which the operation state data changes a little may be "overlooked".

Moreover, suppose that the abnormality data of the abnormality occurring robot Y is extracted from the data storage unit 212, and a threshold Thy is set using the average command current value of the abnormality occurring robot Y. In this case, an abnormality sign of the robot X (usage environment X, usage mode X) which is different from the abnormality occurring robot Y in its usage environment and usage mode is notified using this threshold Thy. At this time, the average command current value may reach the threshold Thy long before an abnormality occurs. In such a case, an abnormality sign is notified even though there is no abnormality sign. In other words, the notification of the abnormality sign is too early. That is, when the threshold is set using the abnormality data of the abnormality occurring robot in which the operation state data changes a little, the abnormality sign of the robot in which the operation state data changes a lot may be "overdetected".

On the other hand, as described above, the abnormality sign notifying system 1 according to this embodiment narrows down the abnormality data used for setting the threshold Th1 based on the environmental information and the usage mode information related to the target robot and then sets the threshold. In other words, it is possible to select the abnormality data related to the environmental information and the usage mode information which are the same as or similar to the environmental information and the usage mode information related to the target robot. This effectively prevents the above-mentioned "overlooking" and the "overdetection" of the abnormality sign from occurring. This also enables the abnormality data used for setting the threshold to be more appropriately set from among a huge number of the abnormality data pieces. Therefore, the abnormality sign notifying system 1 according to this embodiment makes it possible to notify the abnormality sign at a more appropriate timing.

Application Example of First Embodiment

Figure 12:
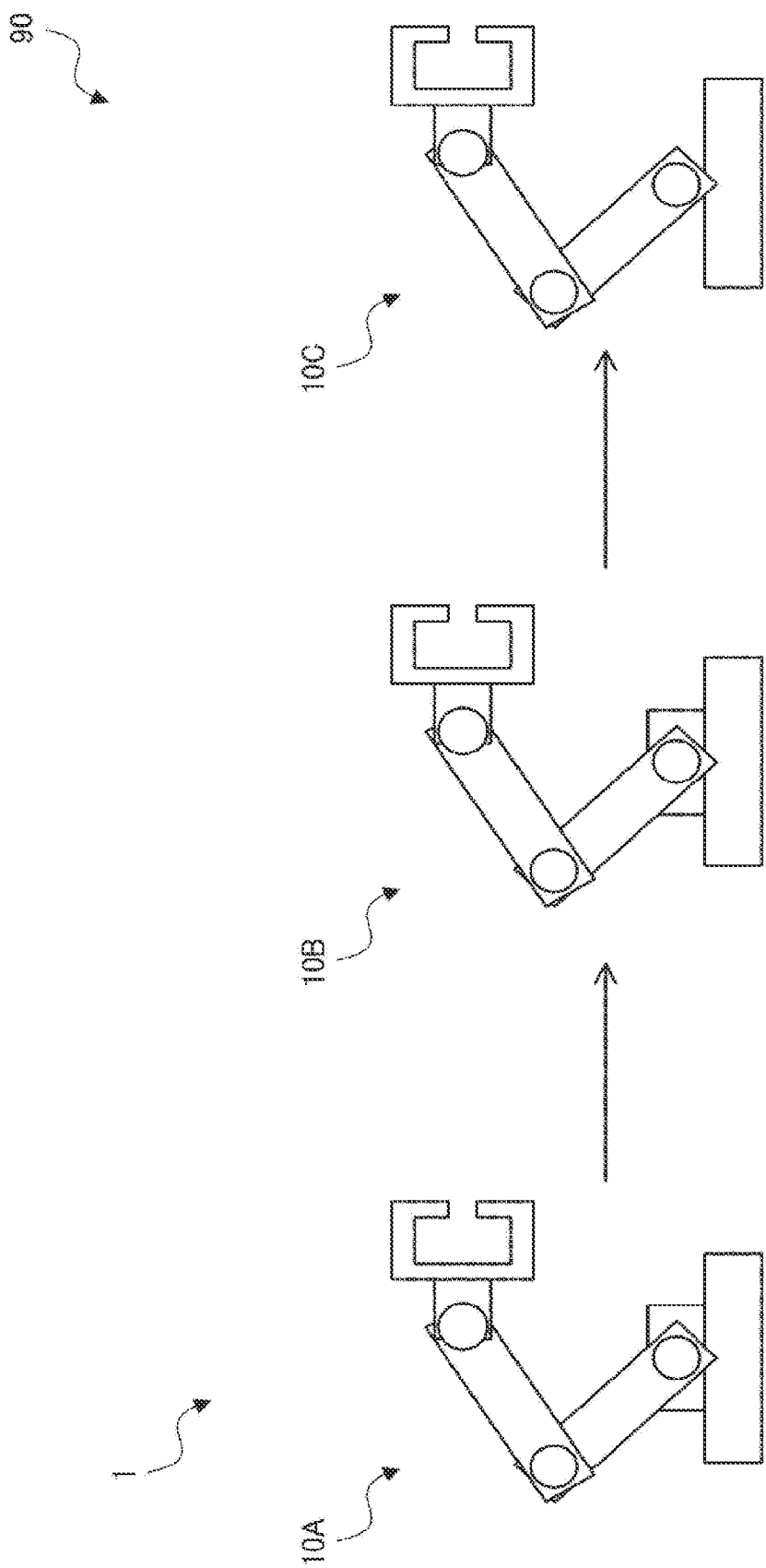
FIG. 12 is a view showing an example in which the abnormality sign notifying system according to the first embodiment is applied to a factory.

FIGS. 12 and 13 are views showing an example in which the abnormality sign notifying system 1 according to the first embodiment is applied to the production line 300 of a factory 90. The factory 90 is, for example, a factory for manufacturing automobiles. As exemplified in FIG. 12, in the factory 90, a robot 10A is used in a welding process. A robot 10B is used in an intermediate coating process. A robot 10C is used in a top coating process. The models of the robot 10A, the robot 10B, and the robot 10C may be the same.

Further, as exemplified in FIG. 13, a robot 10D is used in a process A. The robot 10D is installed on a floor 92 of the factory 90. A robot 10E is used in a process B. The robot 10E is installed on a wall 94 of the factory 90. The models of the robot 10D and the robot 10E may be the same.

Figure 15:
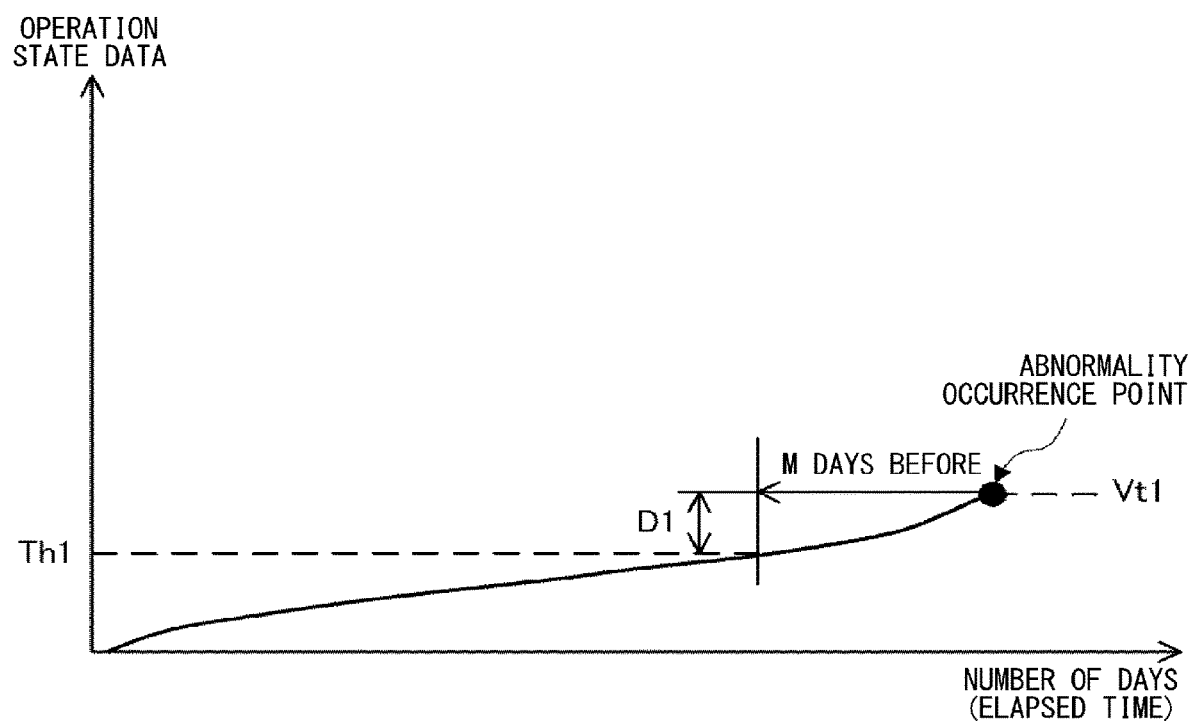
FIG. 15 is a view exemplifying different progress levels of abnormalities depending on a usage environment and a usage mode with the same model of the robots.
Figure 16:
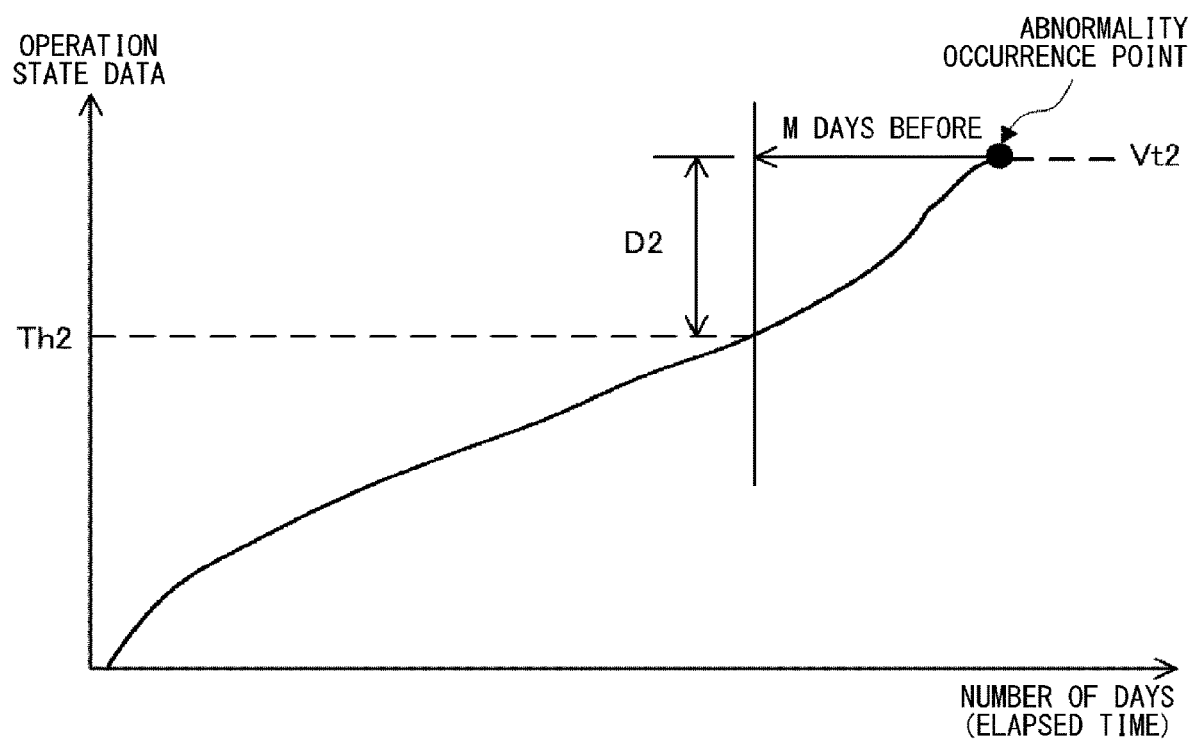
FIG. 16 is a view exemplifying different progress levels of abnormalities depending on a usage environment and a usage mode with the same model of the robots.

FIGS. 14 to 16 are views exemplifying different progress levels of abnormalities depending on the usage environment and the usage mode with the same model of the robots 10. FIG. 14 is a view showing an example of the usage environment and the usage mode. FIG. 15 is a view showing a change in the operation state data when the progress level of the abnormality is low (the abnormality progresses slowly (degradation progresses slowly)). FIG. 16 is a view showing a change in the operation state data when the progress level of the abnormality is high (the abnormality progresses quickly (degradation progresses fast)). In the examples of FIGS. 15 and 16, suppose that the abnormality mode and the operation state data (e.g., the average command current value) are the same. The "condition in which the abnormality is progressing" is a stage before an abnormality such as a failure occurs, and is the state in which the state of the robot 10 is approaching a state in which the abnormality occurs (the abnormality occurrence point).

Regarding the usage environment (temperature), when the temperature of the speed reducer 24 is, for example, less than 60 degrees, the characteristics of grease inside the speed reducer 24 do not change. In this case, as shown in FIG. 15, the progress level of the abnormality of the speed reducer 24 is low. On the other hand, when the temperature of the speed reducer 24 reaches, for example, 60 degrees or higher, the characteristics of the grease in the speed reducer 24 change. In this case, as shown in FIG. 16, the progress level of the abnormality of the speed reducer 24 increases.

Regarding the usage mode, the number of brake operations is small in the welding process such as the spot welding. Therefore, in the welding process, as shown in FIG. 15, the progress level of brake wearing-out is low. On the other hand, in the coating process (the intermediate coating process, the top coating process), the number of brake operations is large. Thus, as shown in FIG. 16, the progress level of brake wearing-out is high in the coating process.

In the top coating process, the number of reciprocating operations of the arm 12 and the like is small. Thus, the number of acceleration/deceleration operations is small. Hence, as shown in FIG. 15, the progress level of the bearing wearing-out of the speed reducer 24 is low in the top coating process. On the other hand, in the intermediate coating process, the number of reciprocating operations of the arm 12 and the like is large. Thus, the number of acceleration/deceleration operations is large. Hence, as shown in FIG. 16, the progress level of the bearing wearing-out of the speed reducer 24 is large in the intermediate coating process.

Moreover, as in the process A shown in FIG. 13, when the mounting direction of the robot 10 is on the floor, the load on a pivot shaft 16 for turning the arm 12 is small. For this reason, in the floor-mounted type, as shown in FIG. 15, the progress level of the abnormality of the speed reducer 24 of the pivot shaft 16 is low. That is, the lifetime of the speed reducer 24 of the pivot shaft 16 is long in the floor-mounted type. On the contrary, as in the process B shown in FIG. 13, when the mounting direction of the robot 10 is wall hanging, the load on the pivot shaft 16 of the arm 12 increases. For this reason, in the wall-hanging type, as shown in FIG. 16, the progress level of the abnormality of the speed reducer 24 of the pivot shaft 16 is high. That is, the lifetime of the speed reducer 24 of the pivot shaft 16 is short in the wall-hanging type.

Here, as shown in FIG. 15, when the progress level of the abnormality is low (the abnormality progresses slowly), the value of the operation state data M days before the abnormality occurrence time (the abnormality occurrence point) is set as the threshold Th1 used for notifying the abnormality sign. In this case, a difference between a value Vt1 of the operation state data and the threshold Th1 at the abnormality occurrence time is set as D1. Further, as shown in FIG. 16, when the progress level of the abnormality is high (the abnormality progresses quickly), the value of the operation state data M days before the abnormality occurrence time is set as a threshold Th2 used for notifying the abnormality sign. In this case, a difference between a value Vt2 of the operation state data and the threshold Th2 at the abnormality occurrence time is set as D2.

At this time, the difference D1 when the progress level of the abnormality is low shown in FIG. 15 is smaller than the difference D2 when the progress level of the abnormality is high shown in FIG. 16. Thus, the threshold is set as a value closer to the value at the abnormality occurrence time when the progress level of the abnormality is low rather than when the progress level of the abnormality is high. In other words, when the progress level of the abnormality is high, the threshold is set to a value distant from the value at the abnormality occurrence time. That is, when the value at the abnormality occurrence time is used as a reference, the threshold when the progress level is low (as compared with the value at the abnormality occurrence time) is large, while the threshold when the progress level of the abnormality is high (as compared with the value at the abnormality occurrence time) is small.

Accordingly, when the progress level of the abnormality is low, the abnormality sign is notified at the timing when the value of the operation state data approaches the value Vt1 at the abnormality occurrence time. As a result, when the progress level of the abnormality is low, the timing of notifying the abnormality sign is delayed with respect to the abnormality occurrence time. On the other hand, when the progress level of the abnormality is high, the abnormality sign is notified at the timing before the value of the operation state data approaches the value Vt2 at the abnormality occurrence time. As a result, when the progress level of the abnormality is high, the timing of notifying the abnormality sign becomes early with respect to the abnormality occurrence time.

Here, between a process (a first process) in which the temperature of the speed reducer 24 is lower than 60 degrees and a process (a second process) in which the temperature of the speed reducer 24 is equal to or higher than 60 degrees, suppose that the models of the robots 10 used are the same, and the abnormality mode of the abnormality occurring in the robots 10 is the same (e.g., bearing wearing-out due to grease degradation). In this case, the notifying unit 126 notifies the abnormality sign related to the robot 10 used in the process where the temperature of the speed reducer 24 reaches 60 degrees or higher at a timing earlier than the timing when it notifies the abnormality sign related to the robot 10 used in a process where the temperature of the speed reducer 24 is lower than 60 degrees.

Further, in the welding process (the first process) and the coating process (the second process), suppose that the models of the robots 10 used are the same, and the abnormality modes of the abnormality occurring in the robot 10 are the same (e g, brake wearing-out). In this case, the notifying unit 126 notifies the abnormality sign related to the robot 10 used in the coating process at a timing earlier than the timing when it notifies abnormality sign related to the robot 10 used in the welding process.

Furthermore, in the top coating process (the first process) and the intermediate coating process (the second process), suppose that the models of the robots 10 used are the same and the abnormality modes of the abnormality occurring in the robot 10 are the same (e.g., the speed reducer Bearing wear, etc.). In this case, the notifying unit 126 notifies the abnormality sign related to the robot 10 used in the intermediate coating process at a timing earlier than the timing when it notifies the abnormality sign related to the robot 10 used in the top coating process.

In addition, in the process (the first process) where the mounting direction of the robot 10 is floor mounted and in the process (the second process) where the mounting direction of the robot 10 is wall hanging, suppose that the models of the robots 10 used are the same, and the abnormality mode of the abnormality occurring in the robots 10 are the same (e.g., an abnormality of the speed reducer of the pivot shaft). In this case, the notifying unit 126 notifies the abnormality sign related to the robot 10 used in the process where the mounting direction is wall hanging at a timing earlier than the timing when it notifies the abnormality sign related to the robot 10 used in the process where the mounting direction is floor mounted.

In this manner, the abnormality sign notifying system 1 according to this embodiment notifies the abnormality sign related to the robot 10 used in the processes (the above respective second processes) used under a more severe condition at an early timing. Therefore, the abnormality sign notifying system 1 according to this embodiment can notify the abnormality sign more reliably at the stage of the abnormality sign before an abnormality occurs even in a process used under a more severe condition.

Next, the above-described embodiments will be described in more detail with reference to FIGS. 17 to 20.

FIG. 17 shows maintenance management data stored in the data storage unit 212 of the monitoring apparatus 200. As shown in FIG. 17, in the maintenance management data, type information of the facility indicated by "facility", type information of the abnormality mode indicated by "abnormality mode", part number information indicated by "part number", stock information indicated by "stock", heavy load information indicated by "heavy load", the number of procurement days information indicated by "procurement days", and the number of working days information indicated by "working days" are associated with one another.

The facility type information is, for example, information for identifying a type of the facility. In the embodiments described above, the robot 10 is exemplified as a specific example of the facility. An example of the facilities installed in the production line 300 other than the above-described robots 10 is a large-sized vehicle body transporter.

The type information of the abnormality mode is information for identifying a type of the abnormality mode.

The part number information is information for identifying a type of a part.

The stock information is information indicating whether a corresponding part is in stock. When the stock information is "YES", it indicates that at least one of the corresponding part is in stock, while when the stock information is "NO", it indicates that the corresponding part is out of stock.

The heavy load information is information indicating a weight of the corresponding part. When the heavy load information is "YES", it indicates that the corresponding part weighs more than or equal to a predetermined weight, meaning that the corresponding part is a heavy load. When the corresponding part is a heavy load, it takes a plurality of days to carry the corresponding part out from the production line 300 and carry it into the production line 300. On the other hand, when the heavy load information is "NO", it indicates that the corresponding part weighs less than the predetermined weight, meaning that the corresponding part is a light load. When the corresponding part is a light load, it does not require a plurality of days to carry the corresponding part out from the production line 300 and carry it into the production line 300. In such a case, for example, the corresponding part can be carried out from the production line 300 and carried into the production line 300 at night after everyday operations in the production line 300. The speed reducer mounted on the robot is, for example, about 6 kg. Further, the speed reducer mounted on the vehicle body transporter is about 500 kg. In this case, when the "predetermined weight", which is a determination criterion, is 50 kg, the former speed reducer is a light load, and the latter speed reducer is a heavy load.

The number of procurement days information is information indicating the number of days required to procure a corresponding part.

The number of working days information is information indicating the number of days required to eliminate the abnormality of the facility using the corresponding part. The number of days required for eliminating the abnormality of the facility includes the number of days required for an actual work for carrying the corresponding part into the production line 300 and carrying it out from the production line 300 and may also include the number of days required for planning this work. That is, for example, when the corresponding component is a heavy load, various preparations are required, such as stopping facilities other than the production line 300 at the same time as the production line 300 is stopped, dismantling facilities other than the production line 300 in advance, ensuring carrying-in and carrying-out routes necessary for the work, and preparing personnel necessary for the work in order to carry in and out the corresponding part. For this reason, in order to eliminate the abnormality of the facility using the part whose heavy load information is "YES", it is necessary to have repeated meetings with many persons in charge in advance.

In such a case, the maintenance management data shown in FIG. 17 can provide information about, when some abnormality occurs in one of the facilities, what kind of part is required, whether the part is in stock, whether the part is a heavy load, how many days are necessary to procure the part if the part is out of stock, and how many days are necessary to eliminate the abnormality of the facility using this part.

Next, Steps S122 and S123 in FIG. 3 will be described in detail.

(Abnormality Elimination Period Estimation Unit 230: Step S122)

The abnormality elimination period estimation unit 230 estimates an abnormality elimination period required for eliminating the abnormality of the facility based on the characteristic information related to the part necessary for eliminating the abnormality of the facility (Step S122 in FIG. 3). The characteristic information here includes at least one of the stock information and heavy load information. In this embodiment, the characteristic information includes both the stock information and the heavy load information.

Figure 18:
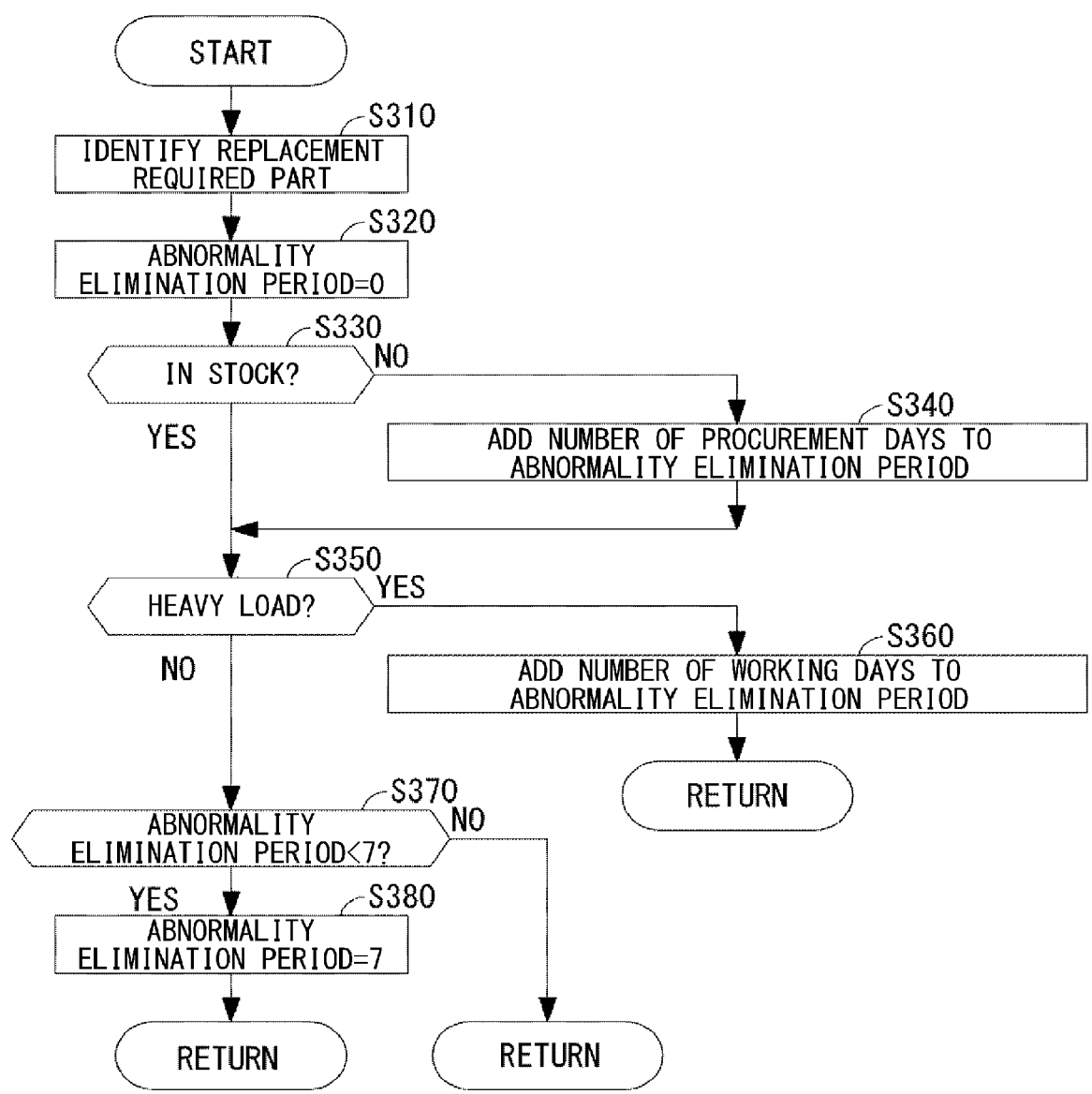
FIG. 18 is a flowchart when an abnormality elimination period estimation unit estimates an abnormality elimination period.

FIG. 18 shows a flow when the abnormality elimination period estimation unit 230 estimates the abnormality elimination period. Hereinafter, the abnormality elimination period estimation unit 230 refers to the maintenance management data as necessary.

Step S310:

First, the abnormality elimination period estimation unit 230 identifies a part and a facility in which the abnormality has occurred based on the abnormality mode identified by the abnormality data determination unit 224. Hereinafter, the part which needs to be replaced to eliminate the abnormality is referred to as a replacement required part.

Step S320:

Next, the abnormality elimination period estimation unit 230 sets the abnormality elimination period to zero.

Step S330:

Next, the abnormality elimination period estimation unit 230 determines whether the replacement required part is in stock. When the replacement required part is out of stock (S330: NO), the abnormality elimination period estimation unit 230 adds the number of procurement days to the abnormality elimination period (S340) and proceeds to S350. On the other hand, when the replacement required part is in stock (S330: YES), the abnormality elimination period estimation unit 230 proceeds to S350. Adding the number of procurement days to the abnormality elimination period when the replacement required part is out of stock in this manner can achieve scheduling with some free time, thereby effectively preventing an operation rate of the production line 300 from decreasing.

Step S350:

Next, the abnormality elimination period estimation unit 230 determines whether the replacement required part is a heavy load. When the replacement required part is a heavy load (S350: YES), the number of working days is added to the abnormality elimination period (S360) to fix the abnormality elimination period, and the estimation of the abnormality elimination period is completed. On the other hand, when the replacement required part is not a heavy load (S350: NO), the abnormality elimination period estimation unit 230 proceeds to S370. Adding the number of working days to the abnormality elimination period when the replacement required part is a heavy load in this manner can achieve scheduling with some free time even when a few days are required for the number of working days like the heavy load, thereby preventing an operation rate of the production line 300 from decreasing.

Step S370:

Next, the abnormality elimination period estimation unit 230 determines whether the abnormality elimination period is less than seven days. When the abnormality elimination period is less than seven days (S370: YES), the abnormality elimination period estimation unit 230 fixes the abnormality elimination period as seven days (S380), and the estimation of the abnormality elimination period is completed. On the other hand, when the abnormality elimination period is not less than seven days (S370: NO), the abnormality elimination period estimation unit 230 fixes the abnormality elimination period, and the estimation of the abnormality elimination period is completed. Seven days is a specific example of the predetermined period. Setting the abnormality elimination period as seven days when the abnormality elimination period is extremely short can achieve scheduling with some free time, thereby effectively preventing an operation rate of the production line 300 from decreasing. Setting the abnormality elimination period as seven days when the abnormality elimination period is extremely short means that the abnormality elimination period includes weekends when the operation of the production line 300 is stopped. This allows the works to eliminate the abnormality of the facility to be carried out on weekends when the operation of the production line is stopped, thereby preventing an operation rate of the production line 300 from decreasing.

(Notifying Time Setting Unit 232: Step S123)

The notifying time setting unit 232 sets the notifying time for notifying the sign of the abnormality of the facility at the abnormality elimination period before the abnormality occurrence time (Step S123 in FIG. 3).

Figure 19:
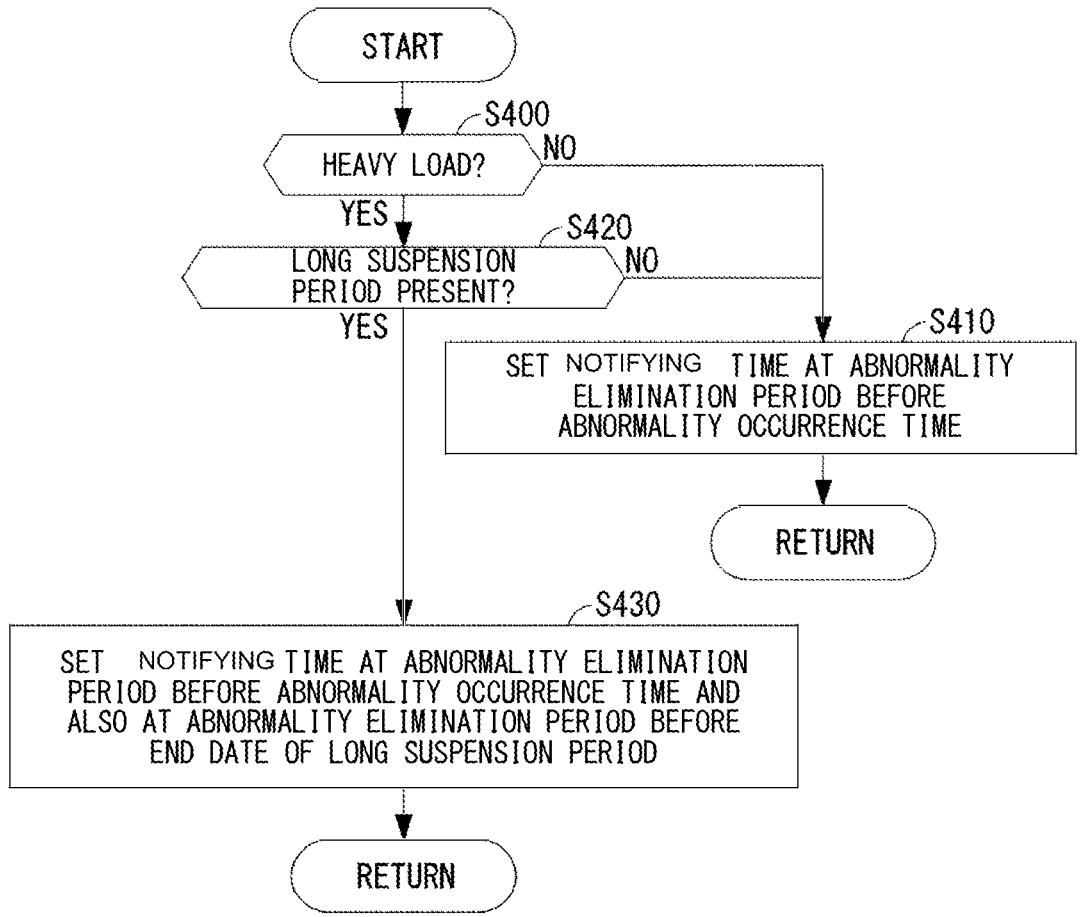
FIG. 19 is a flowchart when a notifying time setting unit sets a notifying time.

FIG. 19 shows a flow when the notifying time setting unit 232 sets the notifying time.

Step S400:

First, the notifying time setting unit 232 determines whether the replacement required part is a heavy load. When the replacement required part is not a heavy load (S400: NO), the notifying time setting unit 232 sets the notifying time at the abnormality elimination period before the abnormality occurrence time (S410). The notifying time setting unit 232 may set the notifying time before the time the abnormality elimination period before the abnormality occurrence time instead of setting the notifying time at the abnormality elimination period before the abnormality occurrence time. On the other hand, when the replacement required part is a heavy load (S400: YES), the notifying time setting unit proceeds to S420.

Step S420:

Next, the notifying time setting unit 232 determines whether there is a long suspension period before the abnormality occurrence time. The long suspension period means a period during which the operation of the production line 300 stops continuously for at least three days or longer. Note that the long suspension period may be a period during which the operation of the production line 300 stops continuously for at least one week or longer or for at least two weeks or longer, instead of a period in which the operation of the production line 300 stops continuously for at least three days or longer. When there is no long suspension period before the abnormality occurrence time (S420: NO), the notifying time setting unit 232 sets the notifying time at the abnormality elimination period before the abnormality occurrence time (S410). On the other hand, when there is a long suspension period before the abnormality occurrence time (S420: YES), the notifying time setting unit 232 proceeds to S430.

Step S430:

Next, the notifying time setting unit 232 sets the notifying time in such a way that it is at the abnormality elimination period before the abnormality occurrence time and that the abnormality elimination period overlaps the long suspension period. More specifically, the notifying time setting unit 232 sets the notifying time at the abnormality elimination period before the end date of the long suspension period. With the above setting, the notifying time is set in such a way that the abnormality elimination period overlaps the long suspension period, thereby effectively preventing the operation rate of the production line 300 from decreasing. In particular, the notifying time is set at the abnormality elimination period before the end date of the long suspension period, with the end date of the long suspension period as a reference day. By doing so, the works that involve stopping the operation of the production line 300, which is carried out in the latter half of the abnormality elimination period, can be carried out during the long suspension period, thereby further effectively preventing the operation rate of the production line 300 from decreasing.

Note that the notifying time setting unit 232 sets the notifying time at the abnormality elimination period before the end date of the long suspension period. However, when a plurality of the long suspension periods are present before the abnormality occurrence time, the notifying time setting unit 232 may set the notifying time based on the long suspension period closest in time to the abnormality occurrence time or based on longer long suspension period. In the former case, the maintenance frequency of the facility is reduced, and thus the cost is reduced. In the latter case, it is possible to effectively prevent the operation rate of the production line 300 from decreasing.

Figure 20:
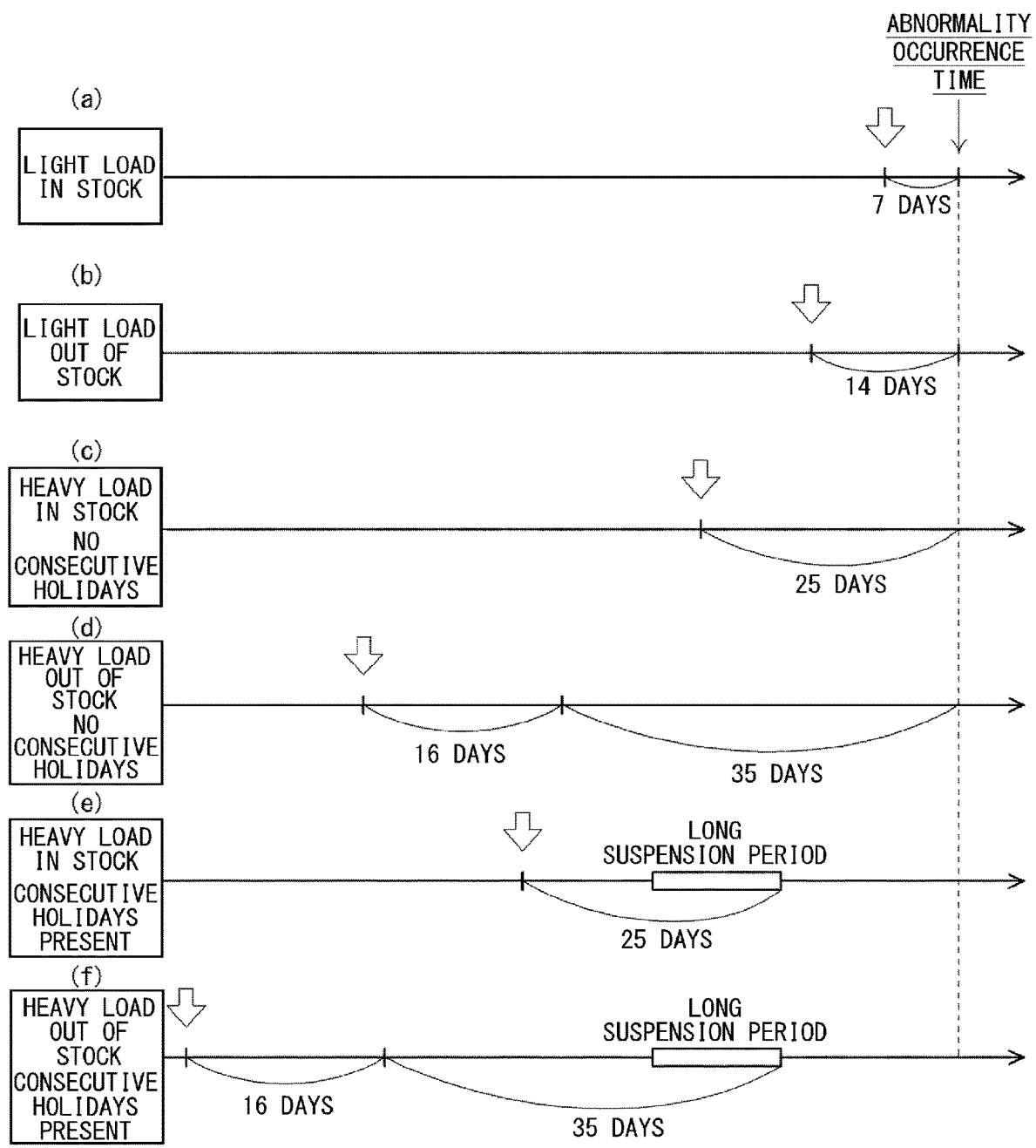
FIG. 20 is a view showing an example of a notifying time setting.

FIG. 20 shows a setting example of the notifying time. In FIG. 20, hollow arrows indicate the notifying time.

FIG. 20(a) shows a case where the replacement required part is a light load and is in stock. This case corresponds, in FIG. 17, to the case where the facility is "robot", and the abnormality mode is "B" or "C". In this case, in the flow of FIG. 18, it is YES in Step S330 and NO in Step S350. Accordingly, it is YES in Step S370. Thus, the abnormality elimination period is set as seven days. Then, in the flow of FIG. 19, it is NO in Step S400. Thus, the notifying time is set at seven days before the abnormality occurrence time.

FIG. 20(b) shows a case where the replacement required part is a light load and is out of stock. This case corresponds, in FIG. 17, to the case where the facility is "robot", and the abnormality mode is "A". In this case, in the flow of FIG. 18, it is NO in Step S330. Thus, 14 days is added to the abnormality elimination period. Then, it is NO in Step S350 and NO in Step S370. Thus, the abnormality elimination period is set as 14 days. Then, in the flow of FIG. 19, it is NO in Step S400.ABus, the notifying time is set at 14 days before the abnormality occurrence time.

FIG. 20(c) shows a case where the replacement required part is the heavy load and is in stock, and there is no long suspension period before the abnormality occurrence time. This case corresponds, in FIG. 17, to the case where the facility is a "vehicle body transporter", and the abnormality mode is "A". In this case, in the flow of FIG. 18, it is YES in Step S330 and YES in Step S350. Thus, the abnormality elimination period is set as 25 days. Then, in the flow of FIG. 19, it is YES in Step S400 and NO in Step S420. Thus, the notifying time is set at a time 25 days before the abnormality occurrence time.

FIG. 20(d) shows a case where the replacement required part is a heavy load and is out of stock, and there is no long suspension period before the abnormality occurrence time. This case corresponds, in FIG. 17, to the case where the facility is the "vehicle body transporter", and the abnormality mode is "B". In this case, in the flow of FIG. 18, it is NO in Step S330 and YES in Step S350. Thus, the abnormality elimination period is set as 51 days, which is obtained by adding 35 days to 16 days. Then, in the flow of FIG. 19, it is YES in Step S400 and NO in Step S420. Thus, the notifying time is set at a time 51 days before the abnormality occurrence time.

FIG. 20(e) shows a case where the replacement required part is a heavy load and is in stock, and there is a long suspension period before the abnormality occurrence time. This case corresponds, in FIG. 17, to the case where the facility is the "vehicle body transporter", and the abnormality mode is "A". In this case, in the flow of FIG. 18, it is YES in Step S330 and YES in Step S350. Thus, the abnormality elimination period is set as 25 days. In the flow of FIG. 19, it is YES in Step S400 and YES in Step S420. Thus, the notifying time is set at a time 25 days before the abnormality occurrence time and also a time 25 days before the end date of the long suspension period.

FIG. 20(f) shows a case where the replacement required part is a heavy load and is out of stock, and there is a long suspension period before the abnormality occurrence time. This case corresponds, in FIG. 17, to the case where the facility is the "vehicle body transporter", and the abnormality mode is "B". In this case, in the flow of FIG. 18, it is NO in Step S330 and YES in Step S350. Thus, the abnormality elimination period is set as 51 days, which is obtained by adding 35 days to 16 days. In the flow of FIG. 19, it is YES in Step S400 and YES in Step S420. Thus, the notifying time is set at a time 51 days before the abnormality occurrence time and also a time 51 days before the end date of the long suspension period.

The preferred embodiments of the present disclosure have been described above. The above embodiments have the following features.

The abnormality sign notifying system 1 includes the abnormality occurrence time estimation unit 228 configured to estimate the abnormality occurrence time at which the abnormality occurs in the facility based on the information related to the operation of the facility installed in the production line 300; the abnormality elimination period estimation unit 230 configured to estimate the abnormality elimination period required for eliminating the abnormality of the facility based on the characteristic information related to the part, which is the replacement required part and is necessary for eliminating the abnormality of the facility, the notifying time setting unit 232 configured to set the notifying time at which the sign of the abnormality of the facility is notified at the abnormality elimination period before the abnormality occurrence time, and the notifying unit 126 configured to notify the sign of the abnormality of the facility at the notifying time. The above configuration achieves the notifying time that is flexibly set by taking the characteristic information into account.

When the abnormality elimination period is less than the predetermined number of days (Step S370: YES), the abnormality elimination period estimation unit 230 estimates the abnormality elimination period in such a way that the abnormality elimination period becomes the predetermined number of days (Step S380). The above configuration enables the abnormality of the facility to be eliminated with enough time in schedule even when the abnormality elimination period is extremely short.

The characteristic information includes information related to whether the replacement required part is in stock. The abnormality elimination period estimation unit 230 estimates the abnormality elimination period in such a way that the abnormality elimination period becomes longer when the part is out of stock than the abnormality elimination period when the part is in stock (Step S340). The above configuration makes it easy to ensure the period required for procuring the replacement required part, thereby reliably eliminating the abnormality of the facility before the abnormality occurrence time.

The abnormality elimination period estimation unit 230 estimates the abnormality elimination period in such a way that the abnormality elimination period becomes longer when the replacement required part is out of stock than the abnormality elimination period when the replacement required part is in stock at least for the period necessary to procure the part (Step S340). According to the above configuration, the period required for procuring the replacement required part can be ensured, and thus the above configuration can more reliably eliminate the abnormality of the facility before the abnormality occurrence time.

The characteristic information includes information related to a weight of the replacement required part. The abnormality elimination period estimation unit 230 estimates the abnormality elimination period in such a way that the abnormality elimination period becomes longer when the weight is the predetermined weight or heavier than the abnormality elimination period when the weight is less than the predetermined weight (Step S360). The above configuration makes it easy to ensure the period required for carrying out and carrying in the replacement required part, thereby reliably eliminating the abnormality of the facility before the abnormality occurrence time.

The abnormality elimination period estimation unit 230 estimates the abnormality elimination period in such a way that the abnormality elimination period becomes longer when the weight is the predetermined weight or heavier than the abnormality elimination period when the weight is less than the predetermined weight at least for a period required for carrying the replacement required part out from the production line and carrying the part into the production line (Step S360). The above configuration makes it possible to ensure the period required for carrying out and carrying in the replacement required part, thereby more reliably eliminating the abnormality of the facility before the abnormality occurrence time.

When the weight of the replacement required part is the predetermined weight or heavier, and there is the long suspension period during which the operation of the production line stops continuously at least for three days or longer before the abnormality occurrence time, the notifying time setting unit 232 sets the notifying time in such a way that the notifying time is at the abnormality elimination period before the abnormality occurrence time and that the abnormality elimination period overlaps the long suspension period (Step S430). The above configuration can eliminate the abnormality of the facility using the long suspension period, thereby effectively preventing the operation rate of the production line 300 from decreasing.

More specifically, the notifying time setting unit 232 sets the notifying time at the abnormality elimination period before the end date of the long suspension period (Step S430). That is, the actual work for carrying-in and carrying-out are carried out in the latter half of the abnormality elimination period. Thus, the above configuration can more effectively prevents the operation rate of the production line 300 from decreasing.

The abnormality sign notifying method includes the abnormality occurrence time estimation step (Step S121) of estimating the abnormality occurrence time at which an abnormality occurs in the facility based on the information related to the operation of the facility installed in the production line 300, the abnormality elimination period estimation step (S122) of estimating an abnormality elimination period required for eliminating the abnormality of the facility based on the characteristic information related to the replacement required part necessary for eliminating the abnormality of the facility, the notifying time setting step (Step S123) of setting the notifying time at which the sign of the abnormality of the facility is notified at the abnormality elimination period before the abnormality occurrence time, and the notifying step (Step S134) of notifying the sign of the abnormality of the facility at the notifying time.

The above-described abnormality sign notifying method may be realized by causing a computer to execute a program.

Modified Example

Note that the present disclosure is not limited to the above-described embodiments, and can be appropriately changed without departing from the spirit of the present disclosure. For example, the order of the steps in the flowchart shown in FIG. 3 can be appropriately changed. One or more of the steps of the flowchart may be omitted.

Further, the abnormality sign notifying system 1 according to this embodiment notifies the abnormality sign related to the robot 10. However, an object, an abnormality sign of which is to be notified, is not limited to a robot. The abnormality sign notifying system 1 according to this embodiment can be applied to any device such as a specified processing apparatus other than the robot 10.

Further, in the abnormality sign notifying system 1 according to this embodiment, the control apparatus 100 and the monitoring apparatus 200 are physically separate apparatuses. However, the present disclosure is not limited to such a configuration. The control apparatus 100 and the monitoring apparatus 200 may be physically integrated. Furthermore, one or more components of the control apparatus 100 may be included in the monitoring apparatus 200.

Likewise, one or more components of the monitoring apparatus 200 may be included in the control apparatus 100.

The abnormality sign notifying system 1 according to the above-described embodiments is configured to determine the abnormality sign using the data for determination (the average command current value etc.) obtained by converting the measurement data (the command current value etc.). However, the present disclosure is not limited to such a configuration. The measurement data (raw data) itself may be used to determine the abnormality sign.

Further, in the abnormality sign notifying system 1 according to the above-described embodiments, in the processing of S110 of FIG. 3, the abnormality data related to the usage mode that is the "same" as the usage mode of the target robot is selected. However, the present disclosure is not limited to such a configuration. The usage modes may not be the same and instead may be similar. In this case, a priority may be set for each item of the usage mode (the robot model, the process, the mounting direction, etc.), and the abnormality data matching only the item with a high priority (e.g., the process) may be selected. Alternatively, points may be provided for each item of the usage mode, and when there is a matching item, the points may be added. Then, the abnormality data with high total points may be selected.

In the above-described embodiments, the "environmental information" is the ambient temperature at which the robot 10 is used. However, the present disclosure is not limited to such a configuration. For example, the "environmental information" may be ambient humidity or air cleanliness.

Additionally, the data storage unit 212 of the monitoring apparatus 200 according to the above embodiments stores the measurement data (raw data). However, the present disclosure is not limited to such a configuration. The data storage unit 212 of the monitoring apparatus 200 may store the data for determination. On the other hand, the data storage unit 212 stores the measurement data, so that the data for determination other than the exemplified data for determination (the average command current value etc.) can be generated by the monitoring apparatus 200 (the data processing unit 216) as appropriate. This is especially effective, for example, when the data for determination, which has not been expected when an abnormality occurs in some robot 10, is generated after a considerable period of time (e.g., a few years) since the abnormality has occurred in this robot 10.

Furthermore, the abnormality sign notifying system 1 according to the above-described embodiments does not need to store the abnormality data in a storage apparatus in the abnormality sign notifying system 1. The abnormality data may be stored in, for example, another server or cloud capable of communicating with the abnormality sign notifying system 1, and the abnormality data may be acquired from the server, the cloud, or the like. In this case, the data storage unit includes a function of storing the abnormality data (the operation state data of the robot 10 in which the abnormality has occurred) in the server, the cloud, or the like in association with the usage mode information and the environmental information.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An abnormality sign notifying system comprising:
   an abnormality occurrence time estimation unit configured to estimate an abnormality occurrence time at which an abnormality occurs in a facility based on information related to an operation of the facility installed in a production line;
   an abnormality elimination period estimation unit configured to estimate an abnormality elimination period required for eliminating the abnormality of the facility based on characteristic information related to a part necessary for eliminating the abnormality of the facility;
   a notifying time setting unit configured to set a notifying time at which a sign of the abnormality of the facility is notified at the abnormality elimination period before the abnormality occurrence time; and
   a notifying unit configured to notify the sign of the abnormality of the facility at the notifying time.

2. The abnormality sign notifying system according to claim 1, wherein when the abnormality elimination period is less than a predetermined number of days, the abnormality elimination period estimation unit estimates the abnormality elimination period in such a way that the abnormality elimination period becomes the predetermined number of days.

3. The abnormality sign notifying system according to claim 1, wherein
   the characteristic information includes information related to whether the part is in stock, and
   the abnormality elimination period estimation unit estimates the abnormality elimination period in such a way that the abnormality elimination period becomes longer when the part is out of stock than the abnormality elimination period when the part is in stock.

4. The abnormality sign notifying system according to claim 3, wherein
   the abnormality elimination period estimation unit estimates the abnormality elimination period in such a way that the abnormality elimination period becomes longer when the part is out of stock than the abnormality elimination period when the part is in stock at least for a period necessary to procure the part.

5. The abnormality sign notifying system according to claim 1, wherein
   the characteristic information includes information related to a weight of the part, and
   the abnormality elimination period estimation unit estimates the abnormality elimination period such that the abnormality elimination period is longer when the weight is greater than or equal to a predetermined weight than the abnormality elimination period when the weight is less than the predetermined weight.

6. The abnormality sign notifying system according to claim 5, wherein the abnormality elimination period estimation unit estimates the abnormality elimination period such that the abnormality elimination period is longer when the weight is greater than or equal to the predetermined weight than the abnormality elimination period when the weight is less than the predetermined weight at least for a period required for carrying the part out from the production line and carrying the part into the production line.

7. The abnormality sign notifying system according to claim 5, wherein when the weight of the part is greater than or equal to the predetermined weight, and there is a long suspension period during which an operation of the production line stops continuously at least for three days before the abnormality occurrence time, the notifying time setting unit sets the notifying time such that the notifying time is at the abnormality elimination period before the abnormality occurrence time and the abnormality elimination period overlaps the long suspension period.

8. The abnormality sign notifying system according to claim 7, wherein the notifying time setting unit sets the notifying time at the abnormality elimination period before an end date of the long suspension period.

9. The abnormality sign notifying system according to claim 5, wherein
   the characteristic information further includes information related to a stock of the part, and
   the abnormality elimination period estimation unit estimates the abnormality elimination period in such a way that the abnormality elimination period becomes longer when the part is out of stock than the abnormality elimination period when the part is in stock.

10. The abnormality sign notifying system according to claim 9, wherein
    the abnormality elimination period estimation unit estimates the abnormality elimination period in such a way that the abnormality elimination period becomes longer when the part is out of stock than the abnormality elimination period when the part is in stock at least for a period necessary to procure the part.

11. An abnormality sign notifying method comprising:
    estimating an abnormality occurrence time at which an abnormality occurs in a facility based on information related to an operation of the facility installed in a production line;
    estimating an abnormality elimination period required for eliminating the abnormality of the facility based on characteristic information related to a part necessary for eliminating the abnormality of the facility;
    setting a notifying time at which a sign of the abnormality of the facility is notified at the abnormality elimination period before the abnormality occurrence time; and
    notifying the sign of the abnormality of the facility at the notifying time.

12. A non-transitory computer readable medium storing a program for causing a computer to execute the abnormality sign notifying method according to claim 11.

* * * * *